(12) United States Patent
Preetham et al.

(10) Patent No.: US 8,212,838 B2
(45) Date of Patent: Jul. 3, 2012

(54) ANTIALIASING SYSTEM AND METHOD

(75) Inventors: Arcot J. Preetham, Sunnyvale, CA (US); Andrew S. Pomianowski, Palo Alto, CA (US); Raja Koduri, Santa Clara, CA (US)

(73) Assignee: ATI Technologies, Inc., Markham, Ontario (CA)

( * ) Notice: Subject to any disclaimer, the term of this patent is extended or adjusted under 35 U.S.C. 154(b) by 870 days.

(21) Appl. No.: 11/140,156

(22) Filed: May 27, 2005

(65) Prior Publication Data

US 2006/0267991 A1 Nov. 30, 2006

(51) Int. Cl.
*G09G 5/00* (2006.01)

(52) U.S. Cl. ........ 345/611; 345/502; 345/503; 345/504; 345/505

(58) Field of Classification Search .......................... None
See application file for complete search history.

(56) References Cited

U.S. PATENT DOCUMENTS

| | | | |
|---|---|---|---|
| 5,392,385 A | 2/1995 | Evangelisti et al. | |
| 5,428,754 A | 6/1995 | Baldwin | |
| 5,459,835 A | 10/1995 | Trevett | |
| 5,539,898 A | 7/1996 | Trevett | |
| 6,191,800 B1 | 2/2001 | Arenburg et al. | |
| 6,243,107 B1 | 6/2001 | Valtin | |
| 6,359,624 B1 | 3/2002 | Kunimatsu | |
| 6,377,266 B1 | 4/2002 | Baldwin | |
| 6,476,816 B1 | 11/2002 | Deming et al. | |
| 6,518,971 B1 | 2/2003 | Pesto, Jr. | |
| 6,535,216 B1 | 3/2003 | Deming | |
| 6,642,928 B1 | 11/2003 | Deming | |
| 6,667,744 B2 | 12/2003 | Buckelew | |
| 6,677,952 B1 | 1/2004 | Baldwin | |
| 6,720,975 B1 * | 4/2004 | Dietrich, Jr. | 345/611 |
| 6,781,585 B2 * | 8/2004 | Naegle et al. | 345/501 |
| 6,816,561 B1 | 11/2004 | Potter | |
| 6,885,376 B2 | 4/2005 | Tang-Petersen | |
| 6,924,799 B2 * | 8/2005 | Lefebvre et al. | 345/419 |
| 6,956,579 B1 | 10/2005 | Diard et al. | |
| 6,967,663 B1 * | 11/2005 | Bastos et al. | 345/613 |
| 7,075,541 B2 | 7/2006 | Diard | |

(Continued)

FOREIGN PATENT DOCUMENTS

EP 0 712 076 5/1996

(Continued)

OTHER PUBLICATIONS

Humphreys, et al., "Chromium: A Stream-Processing Framework for Interactive Rendering on Clusters", ACM Transactions on Graphics ACM USA, vol. 21, No. 3, Jul. 2002, pp. 693-702.

(Continued)

*Primary Examiner* — Kee M Tung
*Assistant Examiner* — Jwalant Amin
(74) *Attorney, Agent, or Firm* — Volpe and Koenig, P.C.

(57) ABSTRACT

A system and method for improved antialiasing in video processing is described herein. Embodiments include multiple video processors (VPUs) in a system. Each VPU performs some combination of pixel sampling and pixel center sampling (also referred to as multisampling and supersampling). Each VPU performs sampling on the same pixels or pixel centers, but each VPU creates samples positioned differently from the other VPUs corresponding samples. The VPUs each output frame data that has been multisampled and/or supersampled into a compositor that composites the frame data to produce an antialiased rendered frame. The antialiased rendered frame has an effectively doubled antialiasing factor.

59 Claims, 13 Drawing Sheets

U.S. PATENT DOCUMENTS

| | | | |
|---|---|---|---|
| 2001/0015753 A1* | 8/2001 | Myers | 348/51 |
| 2004/0066388 A1* | 4/2004 | Leather et al. | 345/611 |
| 2004/0202383 A1* | 10/2004 | Larson et al. | 382/303 |
| 2004/0210788 A1 | 10/2004 | Williams et al. | |
| 2005/0012749 A1 | 1/2005 | Gonzalez et al. | |
| 2005/0041031 A1 | 2/2005 | Diard | |
| 2005/0157183 A1* | 7/2005 | Iijima | 348/220.1 |
| 2005/0206645 A1* | 9/2005 | Hancock | 345/501 |

FOREIGN PATENT DOCUMENTS

| | | |
|---|---|---|
| GB | 2 247 596 | 3/1992 |

OTHER PUBLICATIONS

Molnar, et al., "Pixelflow: High Speed Rendering Using IMAE Composition", Computer Graphics Proceedings., Annual Conference Series, vol. 26, No. 2, Jul. 1992, pp. 231-237.

Correa, et al, "Out-of-Core Sort-First Parallel Rendering for Cluster-Based Tiled Displays", Parallel Computing, Elsevier Publishers, Amsterdam, NL, vol. 29, No. 3, Mar. 2003, pp. 325-338.

Humphreys, et al., "WireGL: A Scalable Graphics System for Clusters", Computer Graphics SIGGRAPH 2001, Conference Proceedings. Los Angeles, CA, Aug. 12-17, 2001, pp. 129-140.

Stoll, et al.,"Lightning-2: A High-Performance Display Subsystem for PC Clusters", Computer Graphics, SIGGRAPH 2001, Conference Proceedings. Los Angeles, CA Aug. 12-17, 2001, pp. 141-148.

Nonaka, et al., "Hybrid Hardware-Accelerated Image Composition for Sort-Last Parallel Rendering on Graphics Clusters With Commodity Image Compositor", Volume Visualization and Graphics, Oct. 2004, IEEE Symposium on Austin, TX, pp. 17-24.

Eldridge, et al., "Pomergranate: A Fully Scalable Graphics Architecture", Computer Graphics. SIGGRAPH 2000 Conference Proceedings. New Orleans, LA, Jul. 23-28, pp. 443-454.

Leiserson, et al., "The Network Architecture of the Connection Machine CM-05",SPAA 92 4th Annual ACM Symposium on Parallel Algorithms and Architectures ACEM New York, NY, 1992, pp. 272-285.

Molnar, et al., "A Sorting Classification of Parallel Rendering", IEEE Computer Graphics and Applications, IEEE Service Center, New York, NY, vol. 14, No. 4, Jul. 1994, pp. 23-32.

Feng, et al., "Extending Open MP for Heterogeneous Chip Multiprocessors", Parallel Processing, 2003. Proceeedings. 2003 International Conference on Oct. 6-9, 2003, Piscataway, NJ, pp. 161-168.

Whitman, Scott, "Dynamic Load Balancing for Parallel Polygon Rendering", IEEE Computer Graphics and Applications, IEEE Service Center, New York, NY, US, vol. 14, No. 4, Jul. 1, 1994, pp. 41-48.

Yung, N.H.C. et al., "Fast and Parallel Video Encoding by Workload Balancing", Systems, Man, and Cybernetics, Oct. 11, 1998, IEEE International Conference on San Diego, CA, vol. 5, pp. 4642-4647.

Nvidia Corporation, High Resolution Antialiasing Through Multisampling, Technical Brief, 2002, 9 Pages.

Lin, et al. "An Anti-Aliasing Method for Parallel Rendering"Computer Graphics International, 1998. pp. 228-235.

* cited by examiner

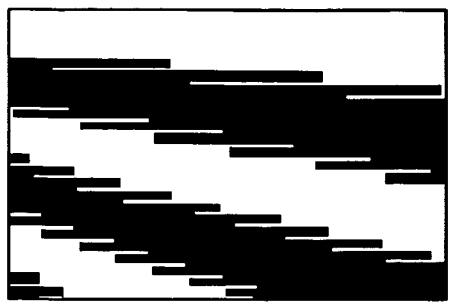
6x MSAA
FIG.9A
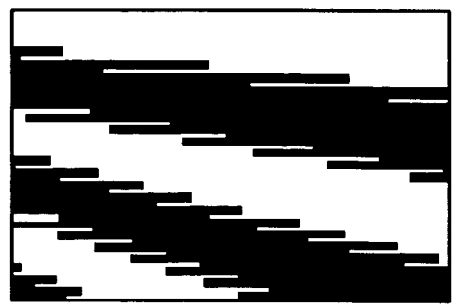
12x MSAA
FIG.9B
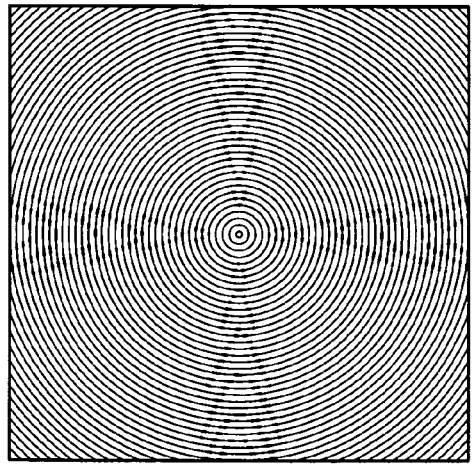
Pixel Shader Anti Aliasing
No SS
FIG.10A
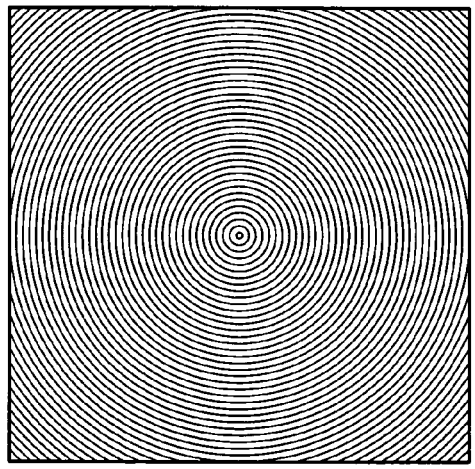
Pixel Shader Anti Aliasing
2x SS
FIG.10B
No SS
FIG.11A
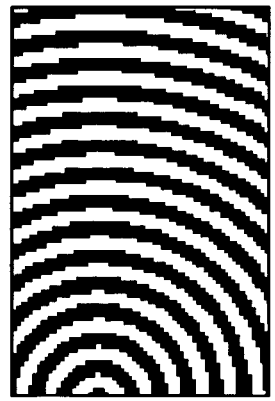
2x SS
FIG.11B
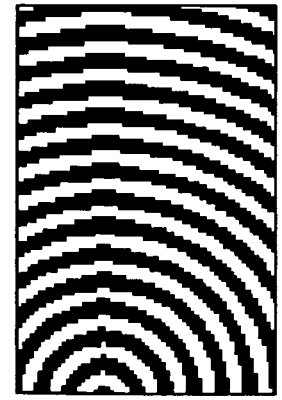

ANTIALIASING SYSTEM AND METHOD

CROSS-REFERENCE

This application is related to the following United States patent applications:

Multiple Video Processing Unit (VPU) Memory Mapping, U.S. application Ser. No. 11/139,917, invented by Philip J. Rogers, Jeffrey Gongxian Cheng, Dmitry Semiannokov, and Raja Koduri, filed concurrently herewith;

Applying Non-Homogeneous Properties to Multiple Video Processing Units (VPUs), U.S. application Ser. No. 11/140,163, invented by Timothy M. Kelley, Jonathan L. Campbell, and David A. Gotwalt, filed concurrently herewith;

Frame Synchronization in Multiple Video Processing Unit (VPU) Systems, U.S. application Ser. No. 11/140,114, invented by Raja Koduri, Timothy M. Kelley, and Dominik Behr, filed concurrently herewith;

Synchronizing Multiple Cards in Multiple Video Processing Unit (VPU) Systems, U.S. application Ser. No. 11/139,744, invented by Syed Athar Hussain, James Hunkins, and Jacques Vallieres, filed concurrently herewith;

Compositing in Multiple Video Processing Unit (VPU) Systems, U.S. application Ser. No. 11/140,165, invented by James Hunkins and Raja Koduri, filed concurrently herewith;

Dynamic Load Balancing in Multiple Video Processing Unit (VPU) Systems, U.S. application Ser. No. 11/139,893, invented by Jonathan L. Campbell and Maurice Ribble, filed concurrently herewith; and Computing Device with Flexibly Configurable Expansion Slots, and Method of Operation, U.S. application Ser. No. 11/140,040, invented by Yaoqiang (George) Xie and Roumen Saltchev, filed May 27, 2005.

Each of the foregoing applications is incorporated herein by reference in its entirety.

TECHNICAL FIELD

The invention is in the field of graphics and video processing.

BACKGROUND

Graphics and video processing hardware and software continue to become more capable, as well as more accessible, each year. Graphics and video processing circuitry is typically present on an add-on card in a computer system, but is also found on the motherboard itself. The graphics processor is responsible for creating the picture displayed by the monitor. In early text-based personal computers (PCs) this was a relatively simple task. However, the complexity of modern graphics-capable operating systems has dramatically increased the amount of information to be displayed. In fact, it is now impractical for the graphics processing to be handled by the main processor, or central processing unit (CPU) of a system. As a result, the display activity has typically been handed off to increasingly intelligent graphics cards which include specialized coprocessors referred to as graphics processing units (GPUs) or video processing units (VPUs).

In theory, very high quality complex video can be produced by computer systems with known methods. However, as in most computer systems, quality, speed and complexity are limited by cost. For example, cost increases when memory requirements and computational complexity increase. Some systems are created with much higher than normal cost limits, such as display systems for military flight simulators. These systems are often entire one-of-a-kind computer systems produced in very low numbers. However, producing high quality, complex video at acceptable speeds can quickly become prohibitively expensive for even "high-end" consumer-level systems. It is therefore an ongoing challenge to create VPUs and VPU systems that are affordable for mass production, but have ever-improved overall quality and capability.

Another challenge is to create VPUs and VPU systems that can deliver affordable, higher quality video, do not require excessive memory, operate at expected speeds, and are seamlessly compatible with existing computer systems.

There are various aspects of video processing that typically require some trade-off between quality and performance to be made. One example is correcting for aliasing, usually referred to as anti-aliasing or "AA". Aliasing is a well known effect created by the appearance in a displayed frame of artifacts of the rendering process. Rendering is performed by the VPU, and involves drawing the pixels to be displayed. Aliasing includes edge aliasing and surface aliasing. Edge aliasing creates stair steps in an edge that should look smooth. Surface aliasing includes flashing or "popping" of very thin polygons, sometimes referred to as moiré patterns. Existing AA techniques for alleviating these effects include multisampling and supersampling. Multisampling addresses edge aliasing by creating multiple samples of pixels which are used to generate intermediate points between pixels. The samples are averaged to determine the displayed pixel color value. The displayed edge in the multisampled image has a softened stair step effect. Multisampling has no affect on surface aliasing.

Supersampling will address both edge aliasing and surface aliasing. However, supersampling is computationally more expensive than multisampling and is rarely performed in consumer systems. Pixel centers, as opposed to pixels, carry texture information. In supersampling, each pixel is rendered multiple times with different pixel centers to yield multiple color values which are then averaged to give a final pixel color. This gives the entire image a softened effect.

One reason it is inefficient to do either multisampling or supersampling in conventional systems is that the pixel data must be run through the video processing pipeline in the VPU more than once to create offset samples with respect to pixels or pixel centers. This increases the number of computations, and increases processing time.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

FIGS. 9A and 9B show results for 6×MSAA and 12×MSAA, respectively.

FIG. 10A shows a screen produced without SSAA.

FIG. 10B shows the same screen as FIG. 10A produced with 2×SSAA.

FIG. 11A shows a screen produced without SSAA.

FIG. 11B shows the same screen as FIG. 11A produced with 2×SSAA.

DETAILED DESCRIPTION

A system and method for antialiasing (AA) that alleviates both edge aliasing effects and surface aliasing effects is described herein. Embodiments include applying a combination of multisampling and supersampling techniques in a system with at least one graphics processing unit (GPU) or video processing unit (VPU). As used herein, GPU and VPU are interchangeable terms. In one embodiment, the system is programmable such that sample positions are programmably offset within a pixel from initial positions by one or more VPUs. The initial positions are determined, for example, by a common video driver of the system. In one embodiment, each of the multiple VPUs processes the same video frame in parallel and offsets samples within the same pixels to different programmable positions in each VPU. Video frames processed by each of the multiple VPUs are merged (or combined or composited) to create a frame to be displayed. In the frame to be displayed, the AA sampling factor is effectively multiplied by the number of VPUs. For example, if each VPU performs 2× sampling, the frame to be displayed includes 4× sampling. In various embodiments, the driver is programmable to direct the VPUs to perform multisampling by a selectable multiplying factor, supersampling by a selectable multiplying factor, or a combination of multisampling by a selectable multiplying factor and supersampling by a selectable multiplying factor.

Figure 1:
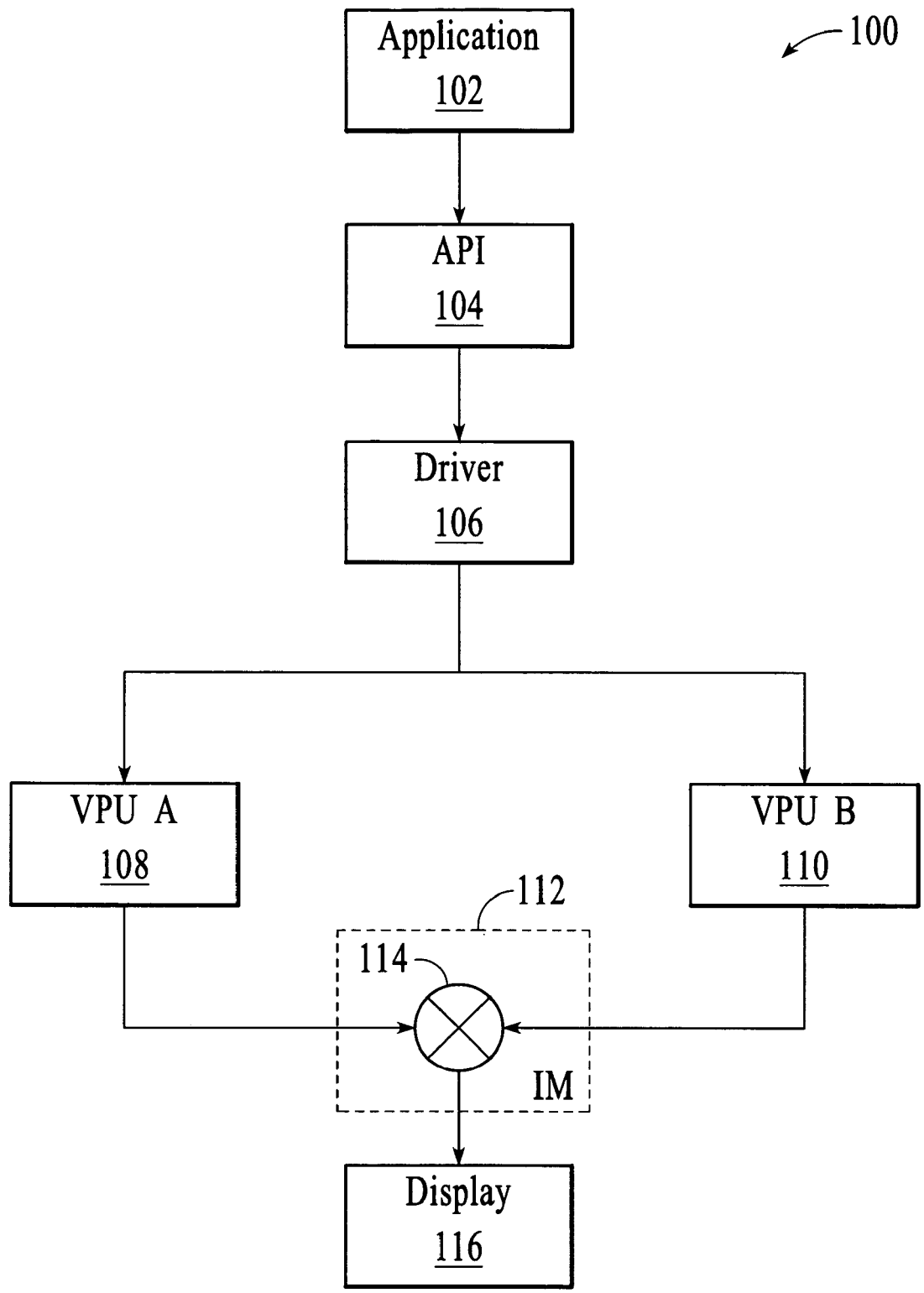
FIG. 1 is a block diagram of a video processing system according to an embodiment.

FIG. 1 is a block diagram of a video processing system 100 according to an embodiment. The system 100 includes an application 102. The application 102 is an end user application that requires video processing capability, such as a video game application. The application 102 communicates with application programming interface (API) 104. Several APIs are available for use in the video processing context. APIs were developed as intermediaries between the application software, such as the application 102, and video hardware on which the application runs. With new chipsets and even entirely new hardware technologies appearing at an increasing rate, it is difficult for applications developers to take into account, and take advantage of, the latest hardware features. It is also becoming impossible to write applications specifically for each foreseeable set of hardware. APIs prevent applications from having to be too hardware specific. The application can output graphics data and commands to the API in a standardized format, rather than directly to the hardware. Examples of available APIs include DirectX (from Microsoft) and OpenGL (from Silicon Graphics).

The API 104 can be any one of the available APIs for running video applications. The API 104 communicates with a driver 106. The driver 106 is typically written by the manufacturer of the video hardware, and translates the standard code received from the API into a native format understood by the hardware. The driver allows input, from, for example, an application, process or user, to direct settings. Such settings, in embodiments described herein, include settings for selecting the multisampling factors, the supersampling factors, or combinations thereof. For example, a user can select settings via a user interface (UI), including a UI supplied to the user with video processing hardware and software as described herein.

In one embodiment, the video hardware includes two video processing units, VPU A 108 and VPU B 110. In other embodiments there can be less than two to or more than two VPUs. In various embodiments, VPU A 108 and VPU B 110 are identical. In various other embodiments, VPU A 108 and VPU B 110 are not identical. The various embodiments, which include different configurations of a video processing system, will be described in greater detail below.

The driver 106 issues commands to VPU A 108 and VPU B 110. The commands issued to VPU A 108 and VPU B 110 at the same time are for processing the same frame to be displayed. VPU A 108 and VPU B 110 each execute a series of commands for processing the frame, including offsetting sample positions with respect to pixels and/or pixel centers in a programmable manner from the sample positions as received from the API. The driver 106 programmably instructs VPU A 108 and VPU B 110 to multisample and/or supersample pixels and/or pixel centers by an antialiasing (AA) factor. In one embodiment, VPU A and VPU B offset samples with respect to the same pixels and/or pixel centers, but offset them to different sample positions.

When either of VPU A 108 and VPU B 110 finishes executing the commands for the frame, the frame data is sent to a compositor 114. The compositor 114 is optionally included in an interlink module 112, as described more fully below. The frame data from each of VPU A 108 and VPU B 110 is merged, or combined, or composited in the compositor 114 to generate a frame to be rendered to a display 116. In the frame to be displayed, the AA sampling factor is effectively multiplied by the number of VPUs. For example, if each VPU performs 2× sampling, the frame to be displayed includes 4× sampling. In various embodiments, the driver 104 is programmable to direct VPU A 108 and VPU B 110 to perform multisampling by a selectable multiplying factor, supersampling by a selectable multiplying factor, or a combination of multisampling by a selectable multiplying factor and supersampling by a selectable multiplying factor. As used herein, the terms combine, merge, composite, mix, or interlink all refer to the same capabilities of the IM 112 and compositor 114 as described herein.

Figure 2:
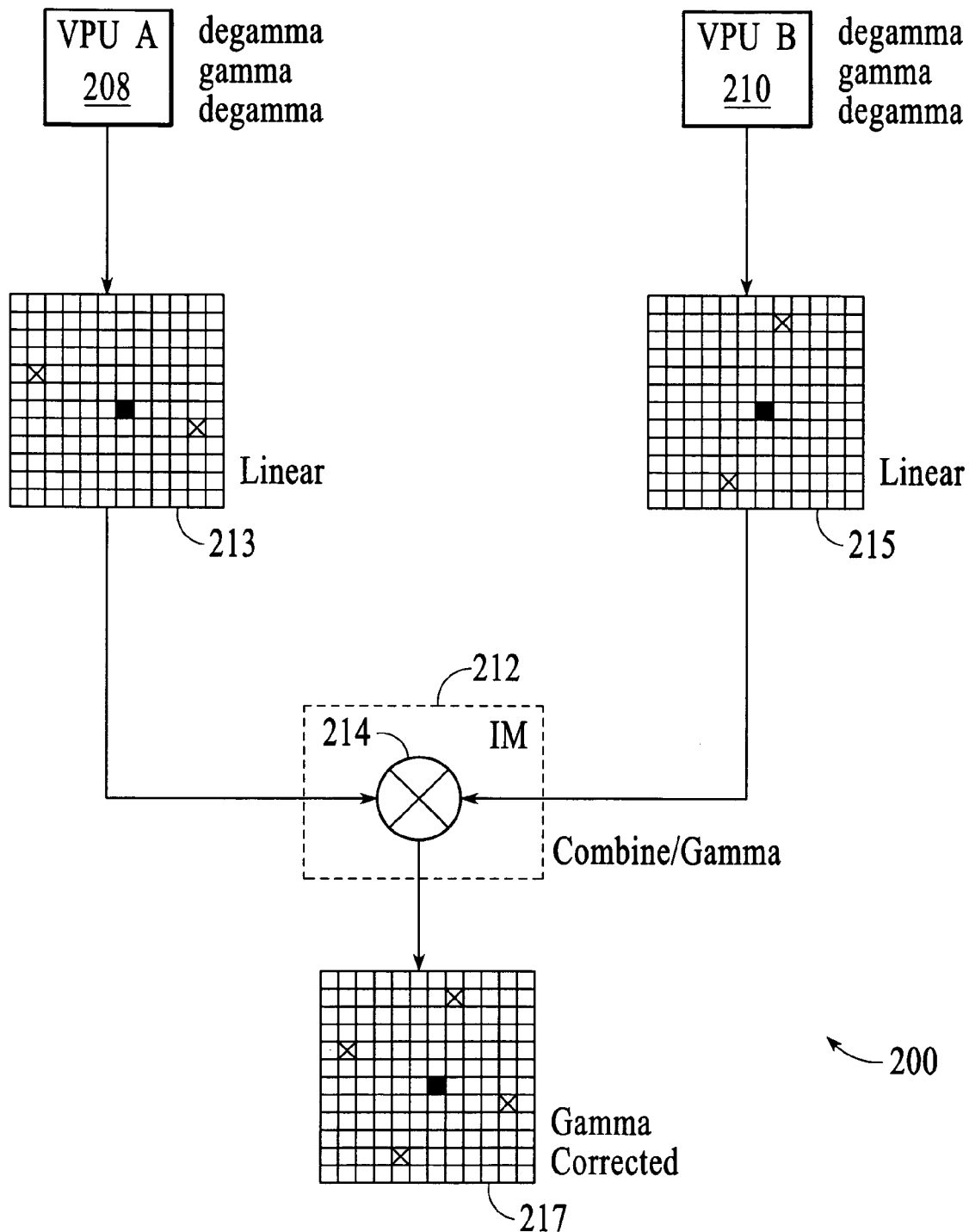
FIG. 2 is a diagram of video processing with anitialiasing according to an embodiment.

FIG. 2 is a diagram of video processing 200 with AA according to an embodiment. As previously described with reference to FIG. 1, VPU A 208 and VPU B 210 each process video data according to instructions from a programmable driver (not shown). An illustration of a sampling pattern 213 output from VPU A 208 is shown. The sampling pattern 213 is a 12×12 grid that demonstrate 2× sampling. For each pixel, 2 pixel samples are placed in the 12×12 grid. The 12×12 dimension is for example purposes only, and any other workable dimension is contemplated. In the example shown, the darkened square is a pixel center and the "X"es are pixel samples. The pixel samples are offset from an initial default location specified by the API (not shown). The offset locations are programmable in the driver and are specified in commands from the driver to the VPU A 208.

Throughout the description, for convenience, the sample pattern output by a VPU will also be referred to as being the output of the VPU. For example, sample pattern 213 is also referred to as output 213 of VPU A 208. Persons of ordinary skill in the art will understand and appreciate that the sample pattern output by a VPU (or as referred to herein as the output of the VPU) is, in most embodiments, not output to the display. Rather, the sample pattern output by the VPU (or portion thereof) is used to generate a frame, or portion thereof, that is ultimately output to a display, such as a LCD, flat panel, CRT or the like. That is, the output sample pattern is in the present and most embodiments used as an input to a further portion of the VPU to generate the frame (or portion thereof) output to a display.

The samples are averaged by the VPU A 208 in linear space in a known manner. However, the pixel data is typically in gamma space, and so must be converted to linear space in a degamma operation prior to averaging. The VPU A 208 performs the degamma operation, performs the averaging operation, and then performs a gamma operation so that the output of the VPU is in gamma space. This is conventionally done because of quality improvement in the displayed image. So to restate, in conventional systems, the output of the VPU is automatically in gamma space. However, in various embodiments herein, it is desirable to have the output in linear space for the combining or compositing operation as described below. Accordingly, the VPU A 208 performs an additional degamma operation to convert the output 213 to linear space. In one embodiment, the texture unit in the video pipeline of the VPU A 208 is used to perform the degamma operation. In other embodiments, this degamma operation can be performed external to the VPU, for example in the compositor 212.

As an example of gamma correction, U.S. Pat. No. 5,398,076, entitled "Gamma Correcting Processing of Video Signals" (assigned to ATI Technologies, Inc.) describes a method of processing video signals including gamma correction of pixel data. In addition, a gamma correction circuit is described in U.S. Pat. No. 6,020,921, entitled "Simple Gamma Correction Circuit for Multimedia" (assigned to ATI Technologies, Inc.). In one embodiment, gamma correction is performed according to the function:

---
If (X <= 0.00304)
    Y = 12.92 * X;
Else
    Y = 1.055 * pow(x, 1.0/2.4) − 0.055
---

In one embodiment, a degamma operation is performed by according to the function ---
If (X <= 0.03928)
    Y = X / 12.92
Else
    Y = pow(X + 0.055)/1.055, 2.4)
---

In one embodiment, the algorithm performed by the compositor 212 can also be stated as follows: flatten each of the three colors of each pixel on both input streams (from VPU A 208 and VPU B 210); add each individual color between VPU A 208 and VPU B 210; divide by 2 and pass to the next step (for example, slave_green+master_green)/2→pre-output green); and convert the pre-output pixel back into gamma corrected color values. In one embodiment, a gamma correction lookup table is used.

Similarly, an output 215 from VPU B 210 is shown. The output 215 is a 12×12 grid that demonstrates 2× sampling. For each pixel, 2 pixel samples are placed in the 12×12 grid. The 12×12 dimension is for example purposes only, and any other workable dimension is contemplated. In the example shown, the darkened square is a pixel, center and the "X"es are pixel samples. The pixel samples are offset from an initial default location specified by the API (not shown). The offset locations are programmable in the driver and are specified in commands from the driver to the VPU B 210.

The samples are averaged by the VPU B 210 in linear space in a known manner. However, the pixel data is typically in gamma space, and so must be converted to linear space in a degamma operation prior to averaging. The VPU B 210 performs the degamma operation, performs the averaging operation, and then performs a gamma operation so that the output of the VPU is in gamma space. This is conventionally done because of quality improvement in the displayed image. So to restate, in conventional systems, the output of the VPU is automatically in gamma space. However, in various embodiments herein, it is desirable to have the output in linear space for the combining or compositing operation as described below. Accordingly, the VPU B 210 performs an additional degamma operation to convert the output 215 to linear space. In one embodiment, the texture unit in the video pipeline of the VPU B 210 is used to perform the degamma operation.

The linear outputs 213 and 215 are combined in a compositor 214. The compositor 214 is optionally included in an interlink module 212, as described more fully below. The frame data from each of VPU A 208 and VPU B 210 is merged, or combined, or composited in the compositor 214 to generate a frame to be rendered to a display (not shown). The compositing operation is in linear space. The compositor 214 completes the compositing operation and performs a gamma operation on the result to produce gamma corrected frame data to be displayed. Output 217 includes gamma corrected pixel data and shows how the outputs 213 and 215 have been combined. Each of outputs 213 and 215 are 2× multisampled, and the output 217 is 4× multisampled. Accordingly, a much improved multisampling result is achieved with one pass through the video pipeline as illustrated in video processing embodiment 200. As described below with reference to FIGS. 3-8, other antialiasing modes are programmably selectable to include various combinations of multisampling and supersampling (sampling pixel centers).

Figure 3:
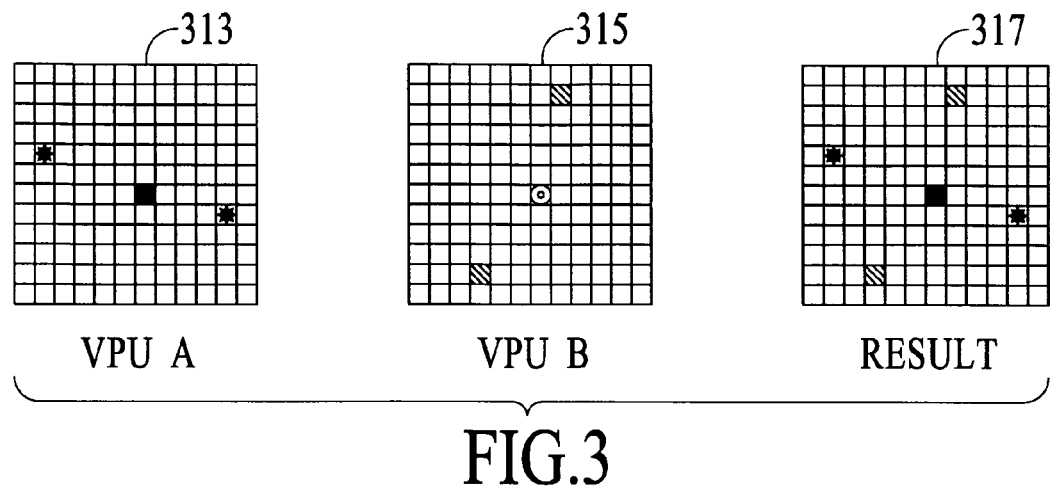
FIGS. 3-8 are pixel diagrams that illustrate several modes of antialiasing according to various embodiments.

Referring to FIGS. 3-8, several modes of antialiasing according to the embodiment described are illustrated. In each of FIGS. 3-8, the pixels for VPU A are represented as stars, the pixel centers for VPU A are represented as a blacked-in grid block, the pixels for VPU B are represented as striped grid blocks, and the pixel centers for VPU B are represented as concentric circles. FIG. 3 is a diagram that shows the mode previously described with reference to FIG. 2. This mode is referred to as 4×MSAA with 1×SSAA, or 4× multisampling AA with 1× supersampling AA (where "4" will be referred to as the MS factor, and "1" will be referred to as the SS factor). Each of VPU A and VPU B sample the pixels as shown in 313 and 315, respectively. After 313 and 315 are combined or composited, the output to be displayed is 317, as shown.

Figure 4:
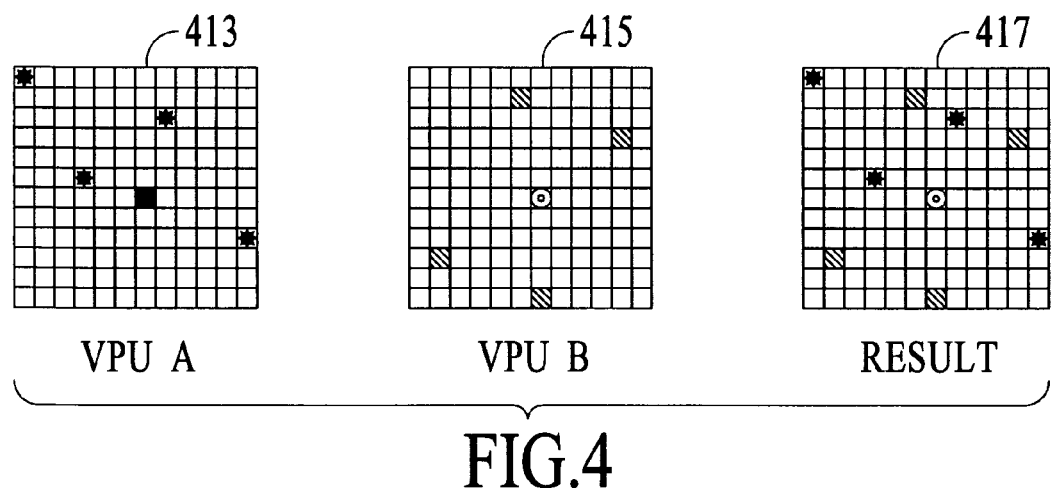

FIG. 4 is a diagram that shows an 8×MSAA with 1×SSAA mode, or 8× multisampling AA with 1× supersampling AA. Each of VPU A and VPU B sample the pixels as shown in 413 and 415, respectively. After 413 and 415 are combined or composited, the output to be displayed is 417, as shown.

Figure 5:
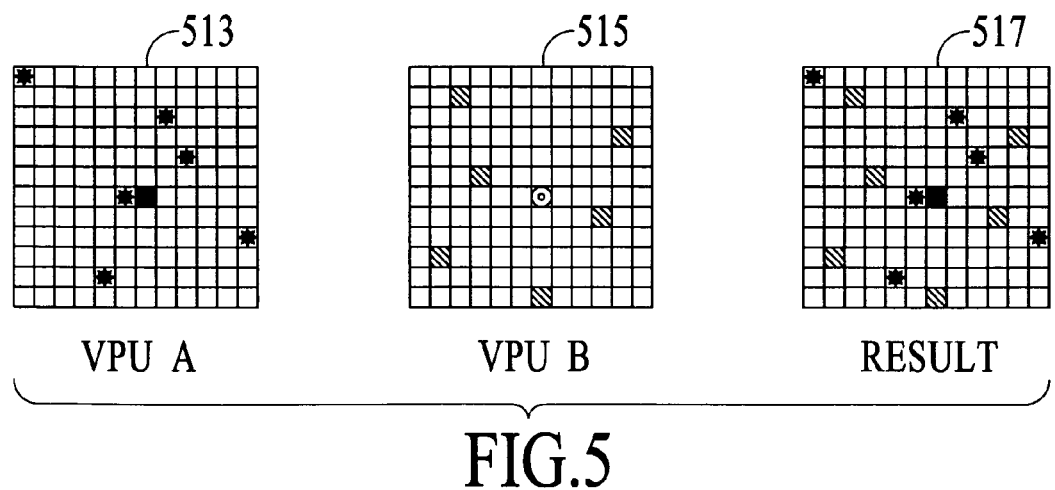

FIG. 5 is a diagram that shows a 12×MSAA with 1×SSAA mode, or 12× multisampling AA with 1× supersampling AA. Each of VPU A and VPU B sample the pixels as shown in 513 and 515, respectively. After 513 and 515 are combined or composited, the output to be displayed is 517, as shown.

Figure 6:
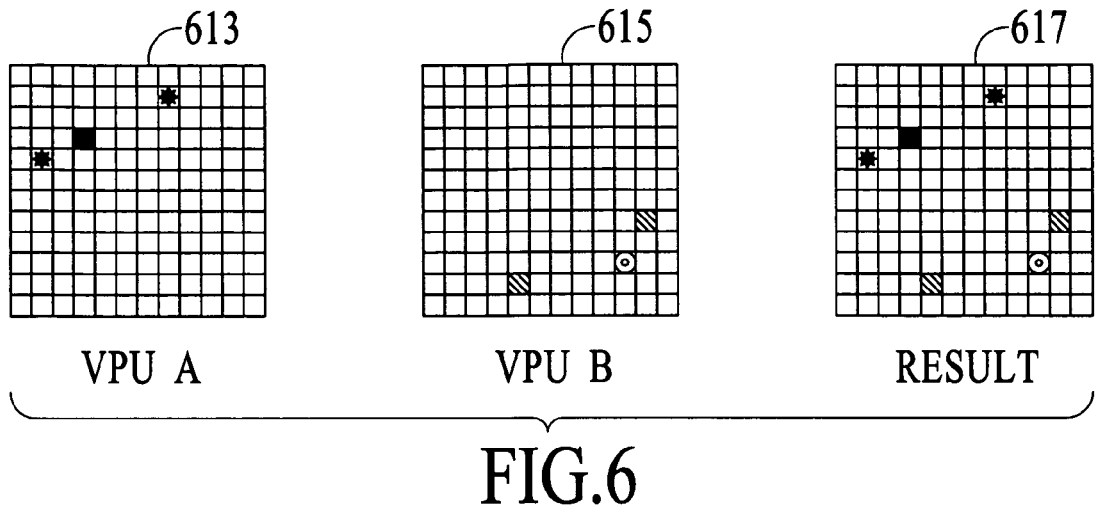

FIG. 6 is a diagram that shows a 4×MSAA with 2×SSAA mode, or 4× multisampling AA with 2× supersampling AA. Each of VPU A and VPU B sample the pixels as shown in 613 and 615, respectively. In this mode, the samples are offset by each of VPU A and VPU B differently. After 613 and 615 are combined or composited, the output to be displayed is 617, as shown.

Figure 7:
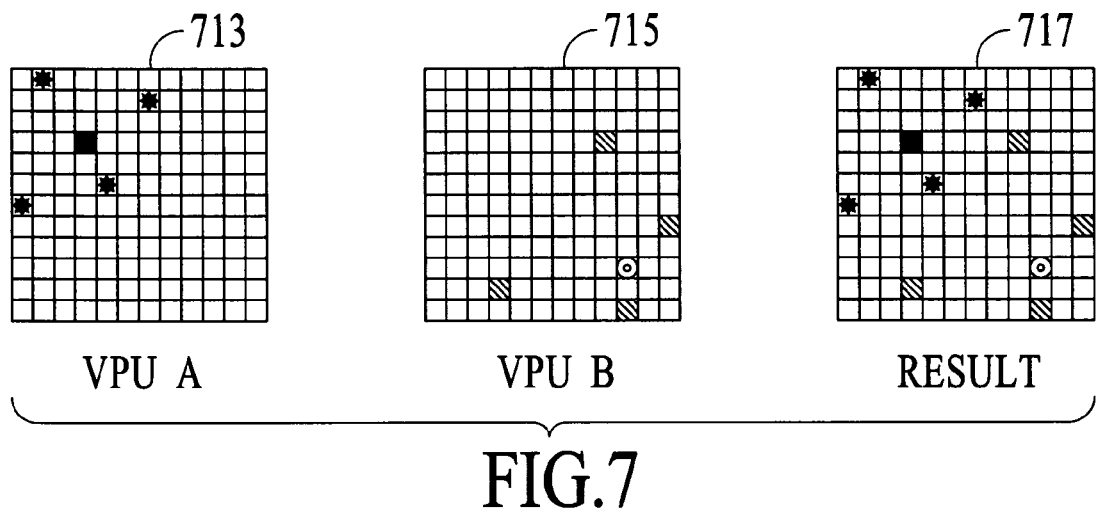

FIG. 7 is a diagram that shows an 8×MSAA with 2×SSAA mode, or 8× multisampling AA with 2× supersampling AA. Each of VPU A and VPU B sample the pixels as shown in 713 and 715, respectively. In this mode, the pixel samples are offset by each of VPU A and VPU B differently. After 713 and 715 are combined or composited, the output to be displayed is 717, as shown.

Figure 8:
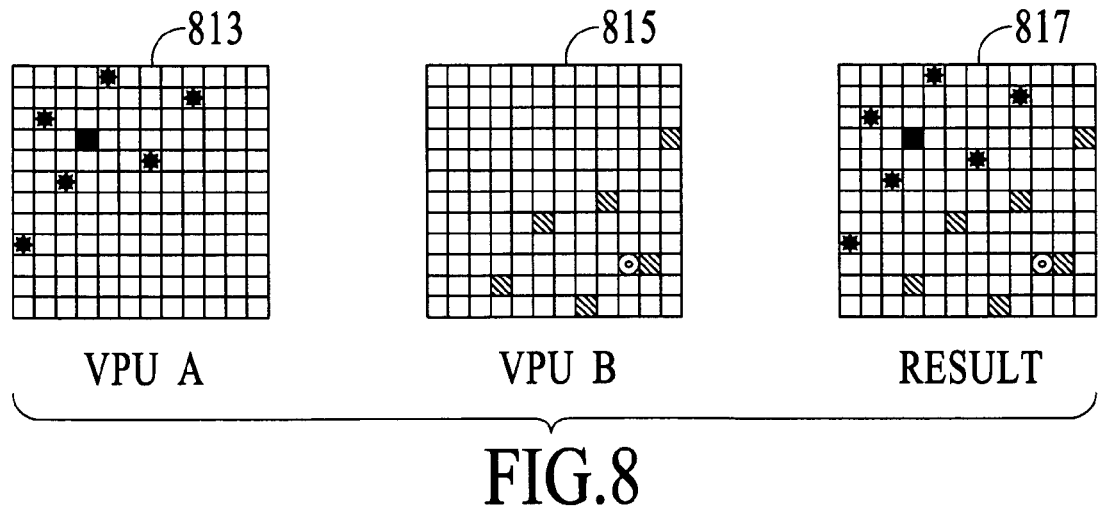

FIG. 8 is a diagram that shows a 12×MSAA with 2×SSAA mode, or 12× multisampling AA with 2× supersampling AA. Each of VPU A and VPU B sample the pixels as shown in 813 and 815, respectively. In this mode, the pixel samples are offset by each of VPU A and VPU B differently. After 813 and 815 are combined or composited, the output to be displayed is 817, as shown.

FIG. 3-8 are given as examples of AA modes that can be configured. Any other combinations are also contemplated. For examples different combination of MS factors and SS factors, or SS alone without MS are all possible. AA factors and MS factors not explicitly shown are all contemplated.

FIGS. 9 and 11 are diagrams of AA results. FIGS. 9A and 9B show results for 6×MSAA and 12×MSAA, respectively. As can be seen, the edge aliasing effect is reduced when the MS factor increased.

FIGS. 10A and 10B are diagrams that illustrate the improvement in quality due to reduction of surface aliasing resulting from SS. FIG. 10A shows a screen produced without SSAA. FIG. 10B shows the same screen produced with 2×SSAA. The moiré effect is significantly reduced in FIG. 10B.

FIGS. 11A and 11B are diagrams are close up views of the screens of FIGS. 10A and 10B, respectively. FIG. 11A shows a screen produced without SSAA. FIG. 11B shows the same screen produced with 2×SSAA.

The antialiasing methods and apparatus described are also applicable to other types of sampling not specifically described, including subsampling and oversampling. The methods and apparatus described are also applicable to temporal antialiasing. For example, in one embodiment, each of multiple VPUs can process a different frame in time. The frames are then composited as described herein.

Various other embodiments also include each of multiple VPUs rendering a same frame in a different manner. For example, one VPU performs multisampling by one factor and another VPU performs sampling by another factor. Similarly, one VPU can perform multisampling on a frame and another VPU can perform supersampling on a frame. The frames generated by each VPU are composited as described herein. In yet other embodiments, one VPU can perform sampling by one sampling factor (where sampling may be any type of sampling) while another VPU performs sampling by another factor. The frames generated by each VPU are composited as described herein. The sampling factor for each VPU is configurable. In one embodiment, the sampling behavior of each VPU is configurable by the user through a UI. In one embodiment, the efficiency of the sampling configuration used may form the basis for configuration by the user through a UI, or for automatic configuration. Alternatively, the performance of relative VPUs may form the basis for configuration by the user through a UI, or for automatic configuration.

Various systems that can embody the antialiasing methods described herein will now be described.

Figure 12:
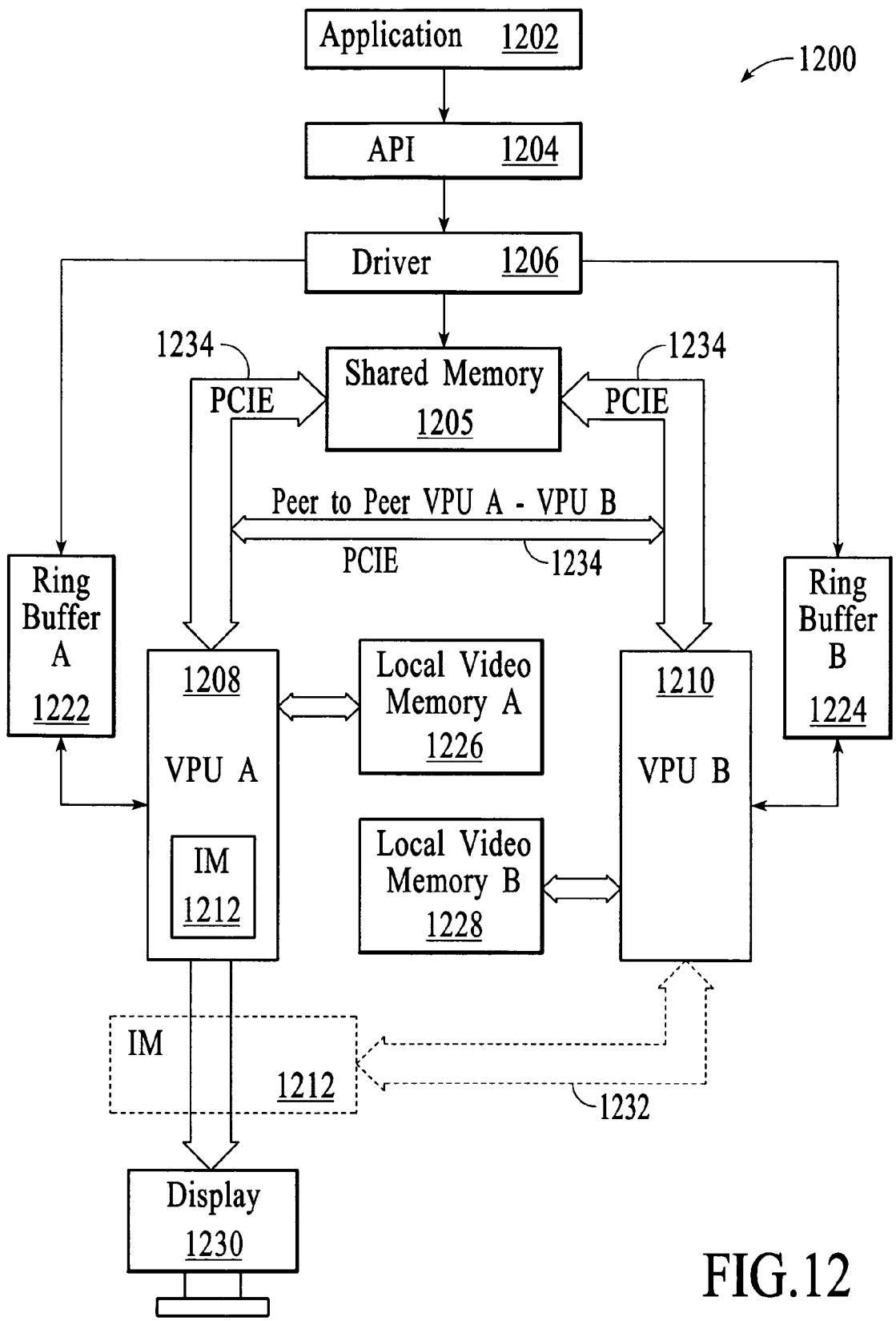
FIG. 12 is a block diagram of a video processing system including antialiasing according to an embodiment.

FIG. 12 is a block diagram of a system 1200 according to an embodiment. The system 1200 includes components or elements that may reside on various components of a video-capable computer system. In one embodiment, an application 1202, a driver 1204, and a shared memory 1205 reside on a host computer system, while remaining components reside on video-specific components, including one or more video cards, but the invention is not so limited. Any of the components shown could reside anywhere, or alternatively, various components could access other components remotely via a network. The application 1202 is an end user application that requires video processing capability, such as a video game application. The application 1202 communicates with application programming interface (API) 1204. The API 1204 can be any one of the available graphics, or video, or 3D APIs including DirectX (from Microsoft) and OpenGL (from Silicon Graphics).

The API 1204 communicates with a driver 1206. The driver 1206 is written specifically for the system 1200, and translates the standard code received from the API 1204 into a native format understood by the VPU components, which will be explained more fully below.

In one embodiment, the system 1200 further includes two VPUs, VPU A 1208 and VPU B 1210. The invention is not limited to two VPUs. Aspects of the invention as described herein would be workable with one VPU with modifications available to one of ordinary skill in the art. However, the system would be less efficient with one VPU than with more than one VPU. Various embodiments also include more than two VPUs. Systems with more than two are workable with modifications available to one of ordinary skill in the art, and would provide better efficiency in at least some respects than a system with two VPUs. In various embodiments VPU A 1208 and VPU B 1210 can be video cards that each includes a video processor and other associated hardware. As will be explained further below, the invention is not so limited. For example, more than one VPU can be resident on one card or board. However, as referred to herein a VPU is intended to include at least a video processor.

VPU A 1208 and VPU B 1210 receive commands and data from the driver 1206 through respective ring buffers A 1222, and B 1224. The commands instruct VPU A 1208 and VPU B 1210 to perform a variety of operations on the data in order to ultimately produce a rendered frame for a display 1230.

The driver 1206 has access to a shared memory 1205. In one embodiment, the shared memory 1205, or system memory 1205, is memory on a computer system that is accessible to other components on the computer system bus, but the invention is not so limited.

In one embodiment, the shared memory 1205, VPU A 1208 and VPU B 1210 all have access to a shared communication bus 1234, and therefore to other components on the bus 1234. In one embodiment, the shared communication bus 1234 is a peripheral component interface express (PCIE) bus, but the invention is not so limited.

The PCIE bus is specifically described in the following documents, which are incorporated by reference herein in their entirety:

PCI Express™, Base Specification, Revision 1.1, Mar. 28, 2005;

PCI Express™, Card Electromechanical Specification, Revision 1.1, Mar. 28, 2005;

PCI Express™, Base Specification, Revision 1.a, Apr. 15, 2003; and

PCI Express™, Card Electromechanical Specification, Revision 1.0a, Apr. 15, 2003.

The Copyright for all of the foregoing documents is owned by PCI-SIG.

In one embodiment, VPU A 1208 and VPU B 1210 communicate directly with each other using a peer-to-peer protocol over the bus 1234, but the invention is not so limited. In other embodiments, there may be a direct dedicated communication mechanism between VPU A 1208 and VPU B 1210.

VPU A 1208 and VPU B 1210 each have a local video memory 1226 and 1228, respectively, available. In various embodiments, one of the VPUs functions as a master VPU and the other VPU functions as a slave VPU, but the invention is not so limited. In other embodiments, the multiple VPUs could be peers under central control of another component. In one embodiment, VPU A 1208 acts as a master VPU and VPU B 1210 acts as a slave VPU.

In one such embodiment, various coordinating and combining functions are performed by an interlink module (IM) 1212 that is resident on a same card as VPU A 1208. This is shown as IM 1212 enclosed with a solid line. In such an embodiment, VPU A 1208 and VPU B 1210 communicate with each other via the bus 1234 for transferring inter-VPU communications (e.g., command and control) and data. For example, when VPU B 1210 transfers an output frame to IM 1212 on VPU A 1208 for compositing (as shown in FIGS. 1 and 2), the frame is transferred via the bus 1234.

In various other embodiments, the IM 1212 is not resident on a VPU card, but is an independent component with which both VPU A 1208 and VPU B 1210 communicate. One such embodiment includes the IM 1212 in a "dongle" that is easily connected to VPU A 1208 and VPU B 1210. This is indicated in the figure by the IM 1212 enclosed by the dashed line. In such an embodiment, VPU A 1208 and VPU B 1210 perform at least some communication through an IM connection 1232. For example, VPU A 1208 and VPU B 1210 can communicate command and control information using the bus 1234 and data, such as frame data, via the IM connection 1232.

There are many configurations of the system 1200 contemplated as different embodiments of the invention. FIGS. 13-17 as described below illustrate just some of these embodiments.

Figure 13:
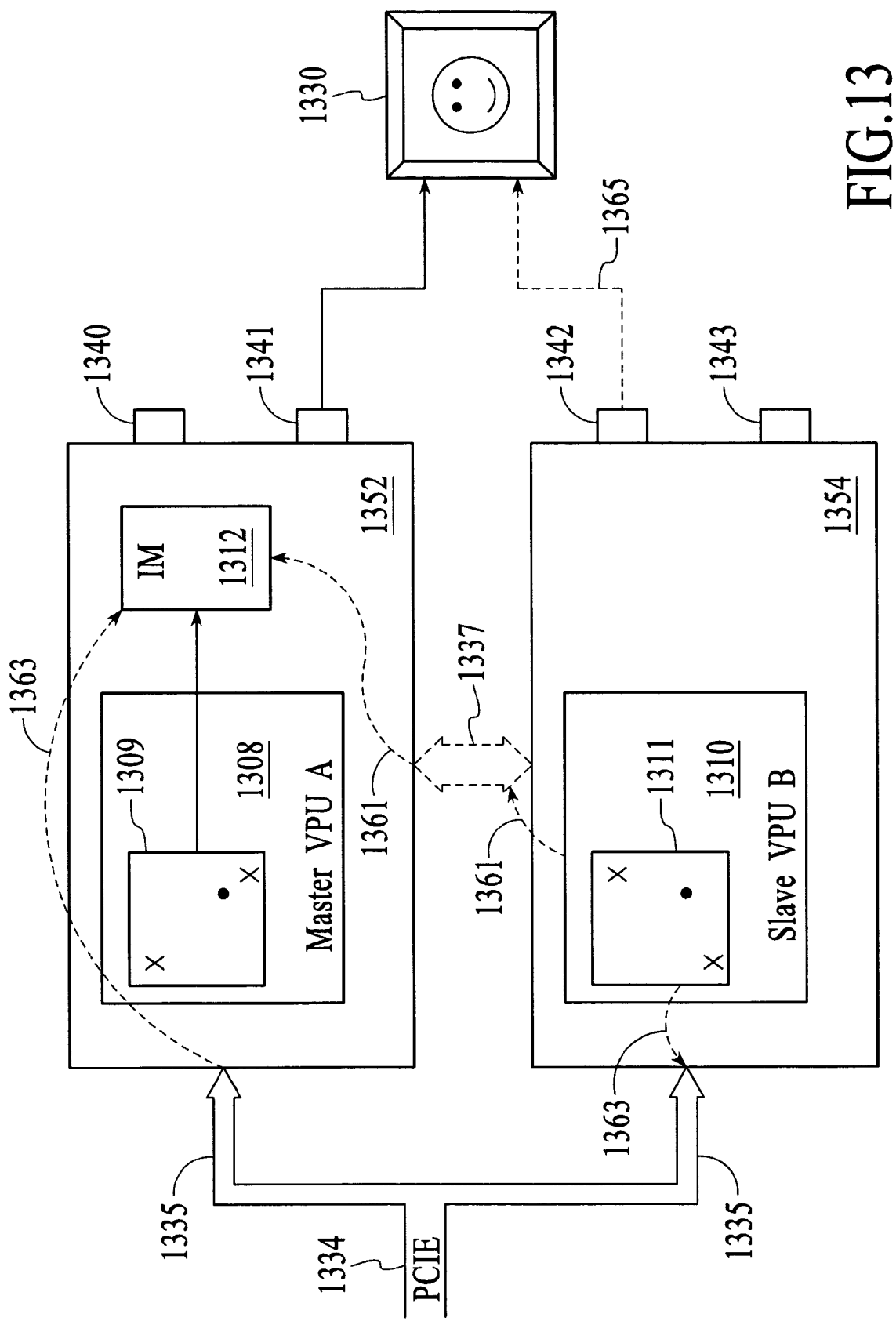
FIG. 13 is a block diagram of various components of a video processing system including antialiasing according to an embodiment.

FIG. 13 is a block diagram of various components of a system 1300 according to an embodiment. The system 1300 includes a master VPU card 1352 and a slave VPU card 1354. The master VPU card 1352 includes a master VPU 1308, and the slave VPU card 1354 includes a slave VPU B 1310. In one embodiment, VPUs 1308 and 1310 each communicate via a PICE bus 1334. In one embodiment, the PCIE bus 1334 is a X16 bus that is split into two X8 PCIE buses 1335. Each of the VPUs A 1308 and B 1310 is connected to a bus 1335. In one embodiment, VPU A 1308 and VPU B 1310 communicate only through the bus 1335. In alternative embodiments, VPU A 1308 and VPU B 1310 communicate partially through bus 1335 and partially through dedicated intercard connection 1337. In yet other embodiments, VPU A 1308 and VPU B 1310 communicate exclusively through the connection 1337.

The master VPU card 1352 includes an IM 1312. In an embodiment in which VPU A 1308 and VPU B 1310 communicate via the bus 1335, each VPU processes a frame, including sampling as explained with reference to FIGS. 1 and 2. As an example in FIG. 13, 4×MSAA is shown being performed by the system 1300. Master VPU A 1308 generates an output 1309 and slave VPU B 1310 generates an output 1311. The outputs 1309 and 1311 are input to the IM 1312 for combining as previously described. In one embodiment, the slave VPU B 1310 transfers it output 1311 to the IM 1312 via the buses 1335 and 1334 as shown by the dotted path 1363. In one embodiment, the slave VPU B 1310 transfers it output 1311 to the IM 1312 via the dedicated intercard connection 1337 as shown by the dotted path 1361. The IM 1312 combines the outputs 1309 and 1311 as previously described to produce a frame for display that includes 4×MSAA. This frame is output to a display 1330 by the IM 1312 via a connector 1341.

The master VPU card 1352 includes connectors 1340 and 1341. The slave VPU card 1354 includes connectors 1342 and 1343. Connectors 1340, 1341, 1342 and 1343 are connectors appropriate for the purpose of transmitting the required signals as known in the art. For example, the connector 1341 is a "digital video in" (DVI) connector in one embodiment. There could be more or less than the number of connectors shown in the FIG. 1300.

In one embodiment, the various embodiments described herein are configurable by a user to employ any number of available VPUs for video processing. For example, the system 1300 includes two VPUs, but the user could choose to use only one VPU in a pass-through mode. In such a configuration, one of the VPUs would be active and one would not. In such a configuration, the antialiasing as described herein would not be available. However, the enabled VPU could perform conventional antialiasing. The dotted path 1365 from VPU card B 1354 to the display 1330 indicates that slave VPU B 1310 can be used alone for video processing in a pass-through mode. Similarly, the master VPU A 1308 can be used alone for video processing in a pass-through mode.

Figure 14:
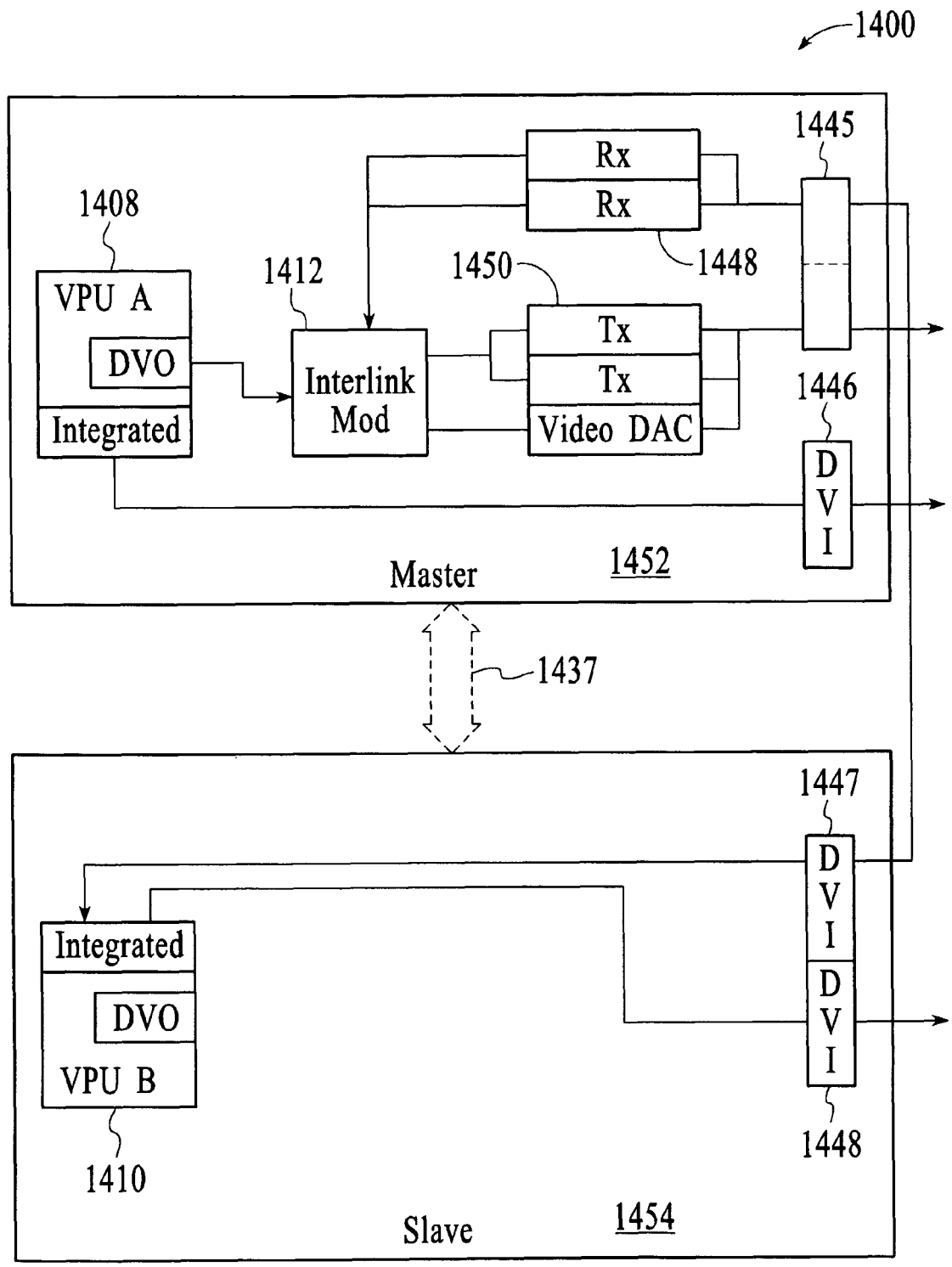
FIG. 14 is a more detailed block diagram of a video processing system, which is a configuration similar to that of FIG. 13 according to an embodiment.

FIG. 14 is a more detailed block diagram of a system 1400, which is a configuration similar to that of FIG. 13 according to an embodiment. The system 1400 includes two VPU cards, a master VPU card 1452 and a slave VPU card 1454. The master VPU card 1452 includes a master VPU A 1408, and the slave VPU card 1454 includes a slave VPU B 1410.

The master VPU card 1452 also includes a receiver 1448 and a transmitter 1450 for receiving and transmitting, in one embodiment, TDMS signals. A dual connector 1445 is a DMS connector in an embodiment. The master card further includes a DVI connector 1446 for outputting digital video signals, including frame data, to a display. The master VPU card 1452 further includes a video digital to analog converter (DAC). An interlink module (IM) 1412 is connected between the VPU A 1408 and the receivers and transmitters as shown. The VPU A 1408 includes an integrated transceiver (labeled "integrated") and a digital video out (DVO) connector.

The slave VPU card 1454 includes two DVI connectors 1447 and 1448. The slave VPU card 1454 includes a DVO connector and an integrated transceiver. As an alternative embodiment to communication over a PCIE bus (not shown), the master VPU card 1408 and the slave VPU card 1410 communicate via a dedicated intercard connection 1437.

Figure 15:
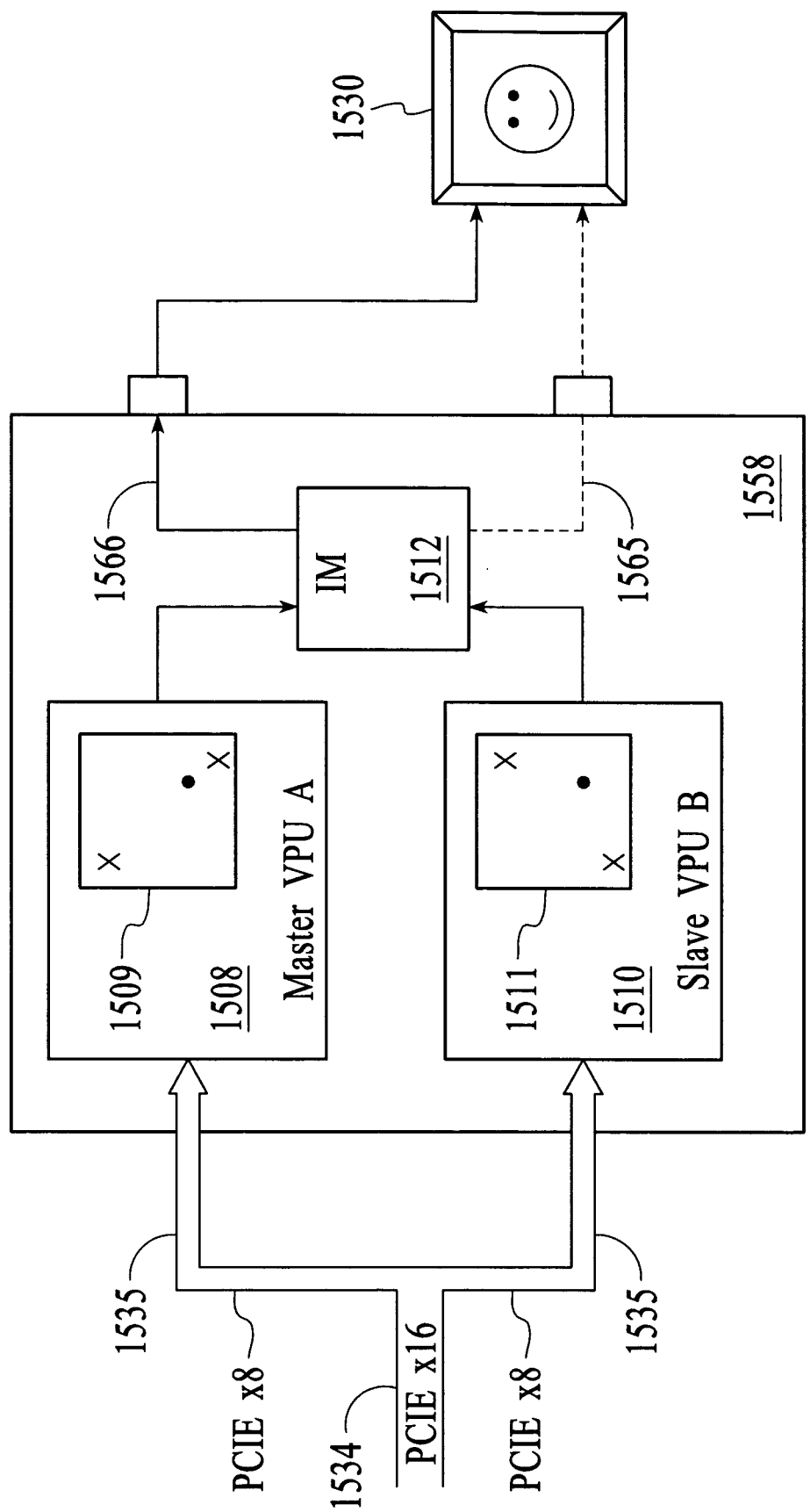
FIG. 15 is a diagram of a one-card video processing system according to an embodiment.
Figure 16:
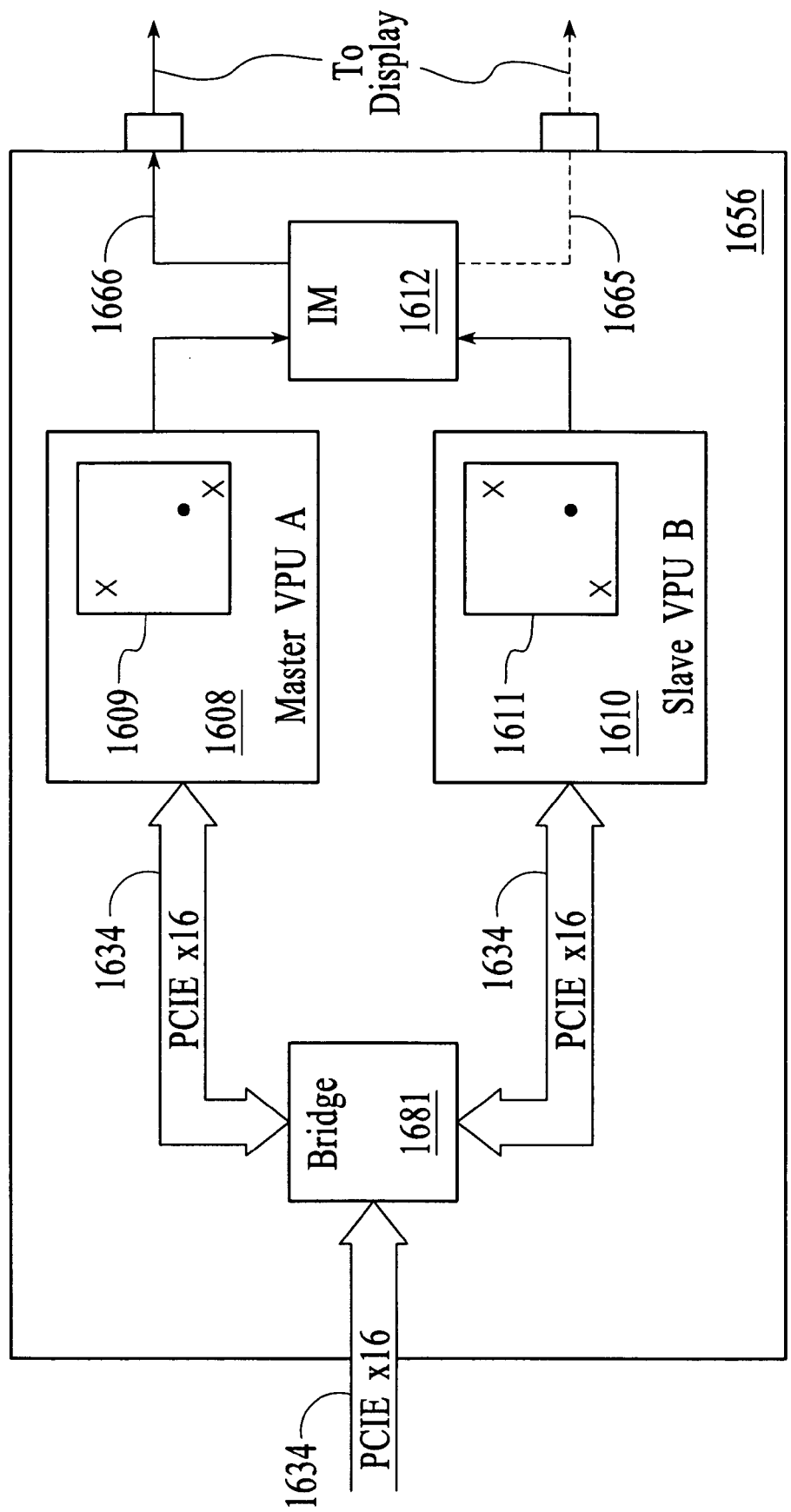
FIG. 16 is a diagram of a one-card video processing system according to an embodiment.
Figure 17:
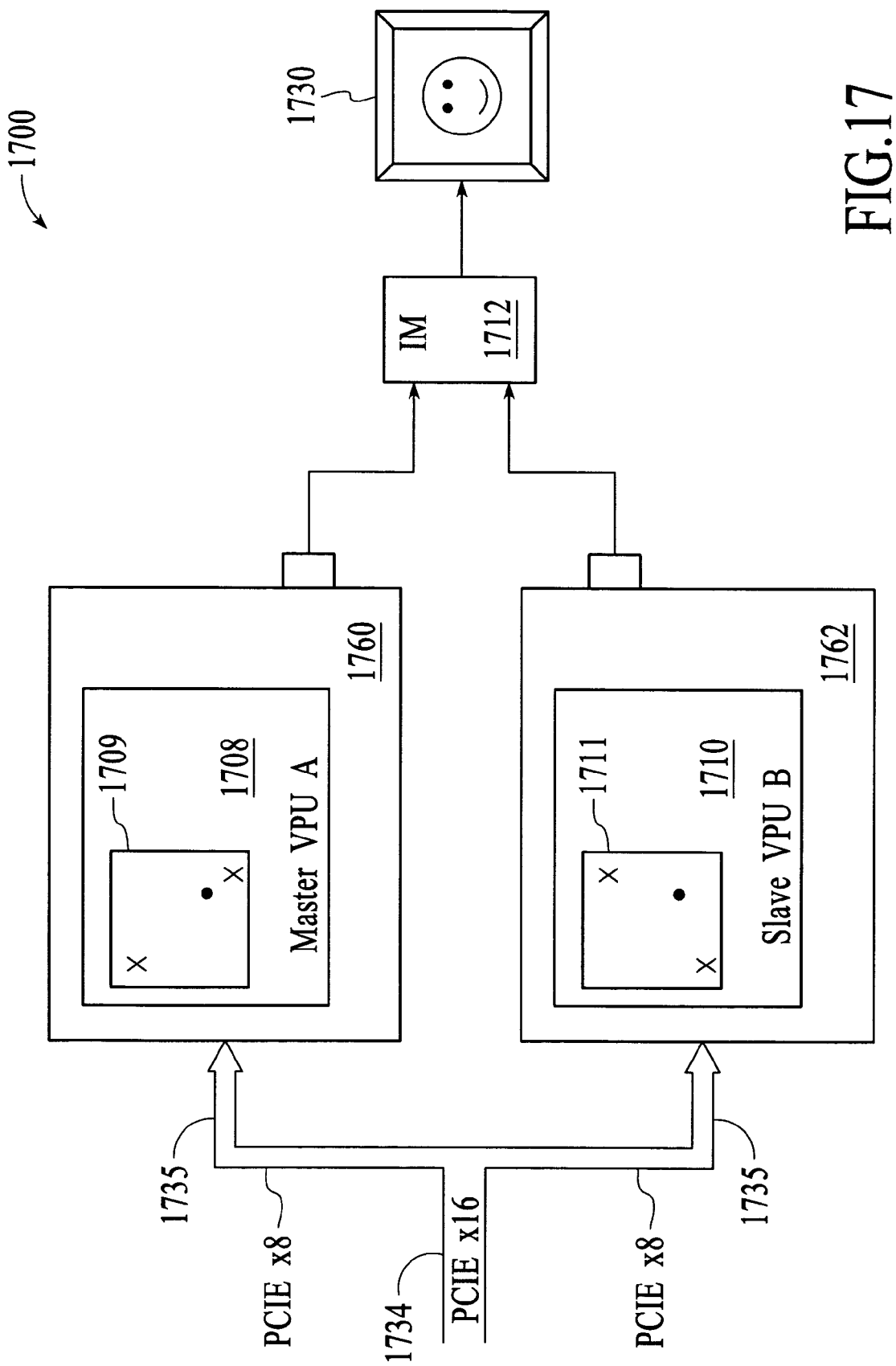
FIG. 17 is a diagram of a two-card video processing system according to an embodiment.

FIGS. 15-17 are diagrams of further embodiments of system configurations. FIG. 15 is a diagram of a one-card system 1500 according to an embodiment. The system 1500 includes a "supercard" or "monstercard" 1558 that includes more than one VPU. In one embodiment, the supercard 1558 includes two VPUs, a master VPU A 1508 and a slave VPU B 1510. The supercard 1558 further includes an IM 1512 that includes a compositor for combining or compositing data from both VPUs as previously described. It is also possible, in other embodiments, to have a dedicated on-card inter-VPU connection for inter-VPU communication (not shown). In one embodiment, the master VPU A 1508 and the slave VPU B 1510 are each connected to an X8 PCIE bus 1535 which comes from a X16 PCIE bus 1534.

The system 1500 includes all of the multiple VPU (also referred to as multiVPU) functionality previously described, including the antialiasing capabilities described. For example, the master VPU A 1508 processes and outputs a sampled frame 1509 to the IM 1512. The slave VPU B 1510 processes and outputs a sampled frame 1511, which is transferred to the IM 1512 for combining or compositing. The transfer is performed via the PCIE bus 1534 or via a dedicated inter-VPU connection (not shown), as previously described with reference to FIG. 1300. In either case, the composited frame is output from the IM 1512 to a display 1530.

It is also possible to disable the multiVPU capabilities and use one of the VPUs in a pass-through mode to perform video processing alone. This is shown for example by the dashed path 1565 which illustrates the slave VPU B 1510 connected to a display 1530 to output frame data for display. The master VPU A 1508 can also operate alone in pass-through mode by outputting frame data on path 1566.

FIG. 16 is a diagram of a one-card system 1600 according to an embodiment. The system 1600 includes a "supercard" or "monstercard" 1656 that includes more than one VPU. In one embodiment, the supercard 1656 includes two VPUs, a master VPU A 1608 and a slave VPU B 1610. The supercard 1656 further includes an IM 1612 that includes a compositor for combining or compositing data from both VPUs as previously described. It is also possible, in other embodiments, to have a dedicated on-card inter-VPU connection for inter-VPU communication (not shown). In one embodiment, the master VPU A 1608 and the slave VPU B 1610 are each connected to a X16 PCIE bus 1634 through an on-card bridge 1681.

The system 1600 includes all of the multiVPU functionality previously described, including the antialiasing capabilities described. For example, the master VPU A 1608 processes and outputs a sampled frame 1609 to the IM 1612. The slave VPU B 1610 processes and outputs a sampled frame 1611, which is transferred to the IM 1612 for combining or compositing. The transfer is performed via the PCIE bus 1634 or via a dedicated inter-VPU connection (not shown), as previously described with reference to FIG. 1300. In either case, the composited frame is output from the IM 1612 to a display (not shown).

It is also possible to disable the multiVPU capabilities and use one of the VPUs in a pass-through mode to perform video processing alone. This is shown for example by the dashed path 1665 which illustrates the slave VPU B 1610 connected to an output for transferring a frame for display. The master VPU A 1608 can also operate alone in pass-through mode by outputting frame data on path 1666.

FIG. 17 is a diagram of a two-card system 1700 according to an embodiment. The system 1700 includes two peer VPU cards 1760 and 1762. VPU card 1760 includes a VPU A 1708, and VPU card 1762 includes a VPU B 1710. In one embodiment, VPU A 1708 and VPU 1710 are identical. In other embodiments VPU A 1708 and VPU B 1710 are not identical. VPU A 1708 and VPU 1710 are each connected to an X8 PCIE bus 1735 that is split from an X16 PCIE bus 1734. VPU A 1708 and VPU 1710 are further each connected to output data through a card connector to an interlink module (IM) 1712. In one embodiment, the IM 1712 is an integrated circuit in a "dongle" that is easily connectable to VPU card 1760 and VPU card 1762. In one embodiment, the IM 1712 is an integrated circuit specifically designed to include all of the compositing functionality previously described. The IM 1712 merges or composites the frame data output by VPU A 1708 and VPU 1710 and outputs a displayable composited frame to a display 1730.

Figure 18:
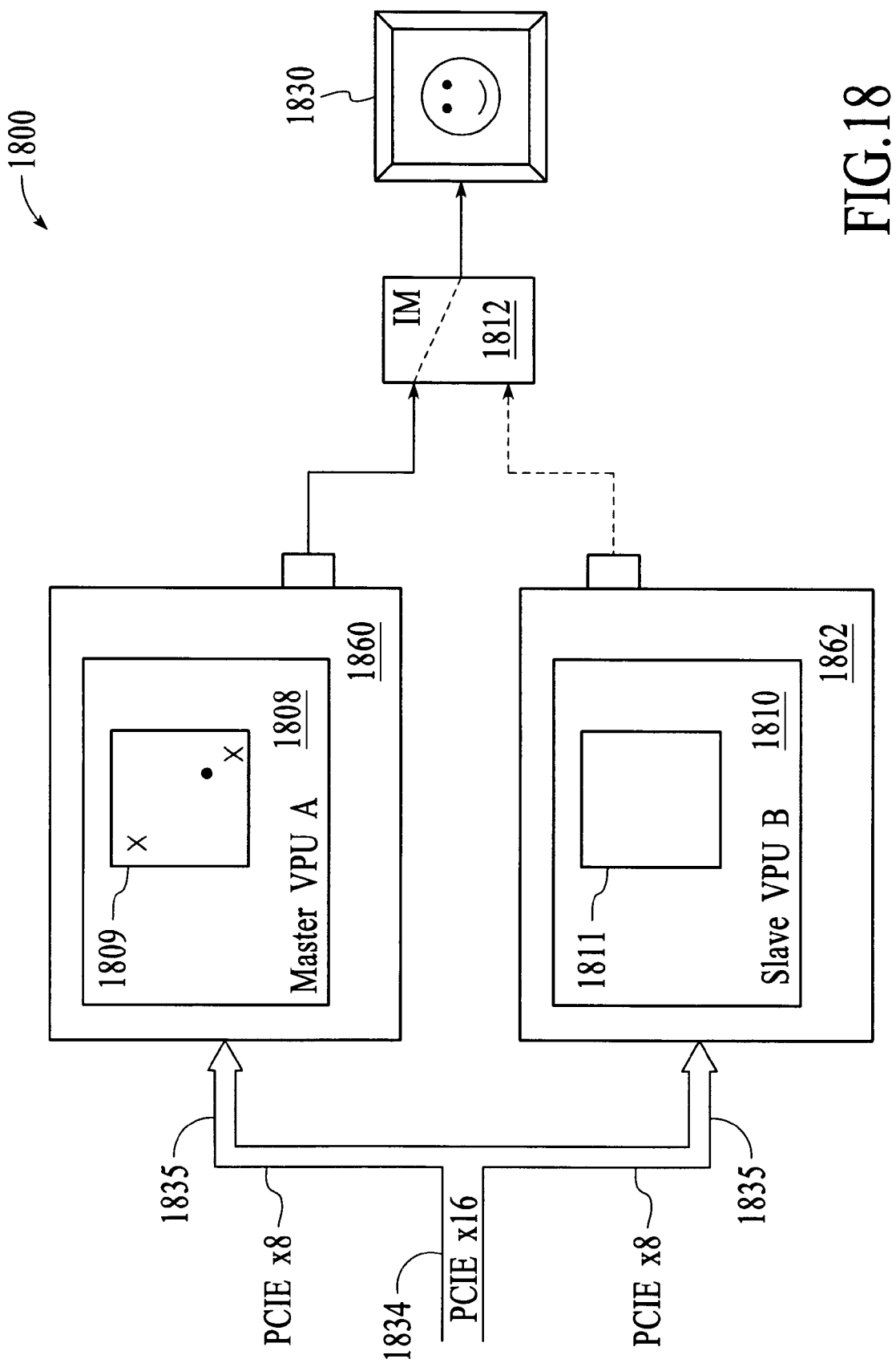
FIG. 18 is a diagram of a two-card video processing system according to an embodiment.

FIG. 18 is a diagram of a two-card system 1800 according to an embodiment. The system 1800 is similar the system 1700, but is configured to operate in a by-pass mode. The system 1800 includes two peer VPU cards 1860 and 1862. VPU card 1860 includes a VPU A 1808, and VPU card 1862 includes a VPU B 1810. In one embodiment, VPU A 1808 and VPU 1810 are identical. In other embodiments VPU A 1808 and VPU B 1810 are not identical. VPU A 1808 and VPU B 1810 are each connected to an X8 PCIE bus 1835 that is split from a X16 PCIE bus 1834. VPU A 1808 and VPU 1810 are further each connected through a card connector to output data to an interlink module (IM) 1812. In one embodiment, the IM 1812 is an integrated circuit in a "dongle" that is easily connectable to VPU card 1860 and VPU card 1862. In one embodiment, the IM 1812 is an integrated circuit specifically designed to include all of the compositing functionality previously described. The IM 1812 is further configurable to operate in a pass-through mode in which one of the VPUs operates alone and the other VPU is not enabled. In such a configuration, the antialiasing as described herein would not be available. However, the enabled VPU could perform conventional antialiasing. In FIG. 18, VPU A 1808 is enabled and VPU B 1810 is disabled, but either VPU can operate in by-pass mode to output to a display 1830.

The configurations as shown herein, for example in FIGS. 13-18, are intended as non-limiting examples of possible embodiments. Other configurations are within the scope of the invention as defined by the claims. For example, other embodiments include a first VPU installed on or incorporated in a computing device, such as a personal computer (PC), a notebook computer, a personal digital assistant (PDA), a TV, a game console, a handheld device, etc. The first VPU can be an integrated VPU (also known as an integrated graphics processor, or IGP), or a non-integrated VPU. A second VPU is installed in or incorporated in a docking station or external enclosed unit. The second VPU can be an integrated VPU or a non-integrated VPU.

In one embodiment, the docking station is dedicated to supporting the second VPU. The second VPU and the first VPU communicate as described herein to cooperatively perform video processing and produce an output as described. However, in such an embodiment, the second VPU and the first VPU communicate via a cable or cables, or another mechanism that is easy to attach and detach. Such an embodiment is especially useful for allowing computing devices which may be physically small and have limited video processing capability to significantly enhance that capability through cooperating with another VPU.

It will be appreciated by those of ordinary skill in the art that further alternative embodiments could include multiple VPUs on a single die (e.g., two VPUs on a single die) or multiple cores on a single silicon chip.

Figure 19:
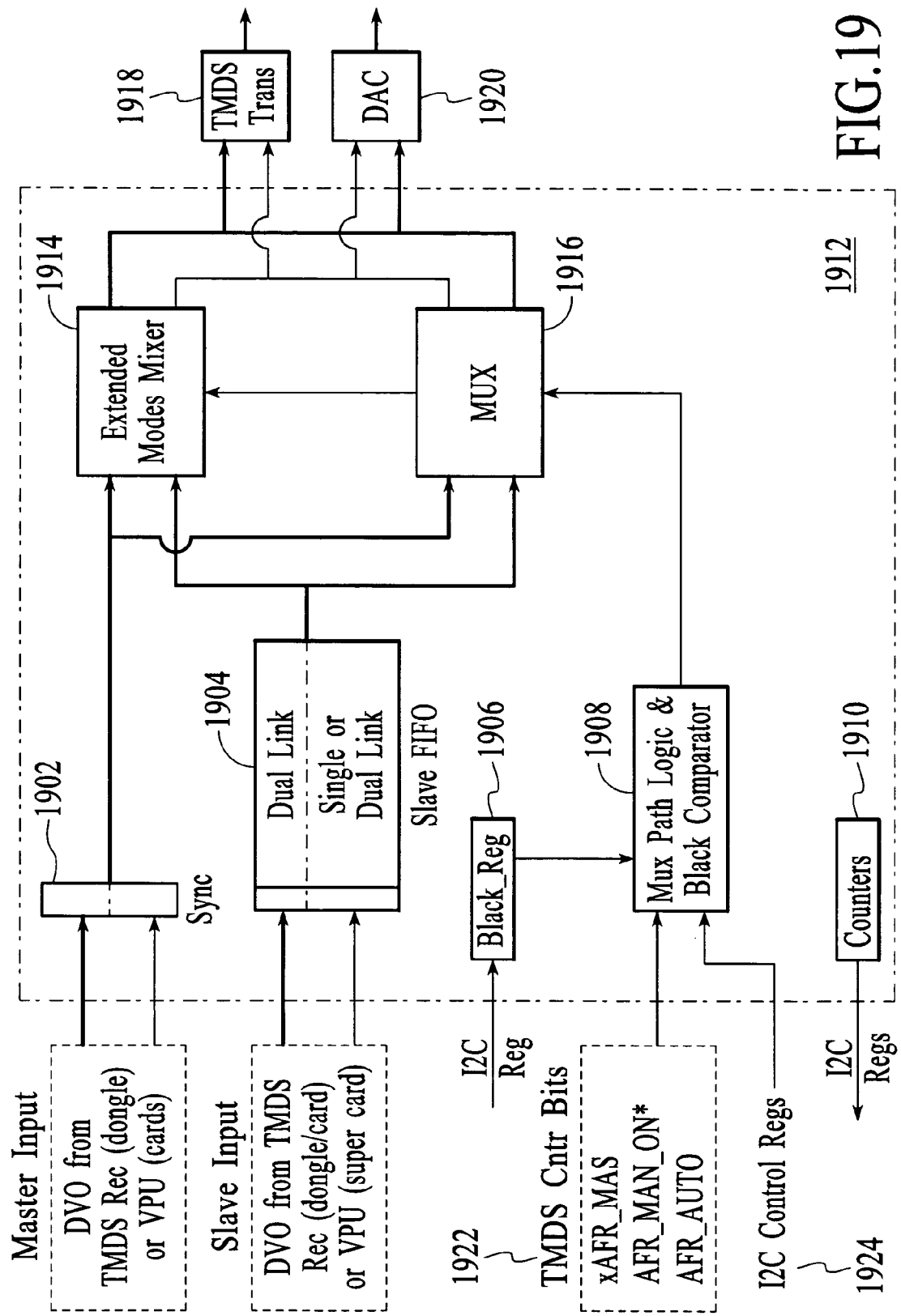
FIG. 19 is a block diagram of an interlink module (IM) according to an embodiment.

FIG. 19 is a block diagram of an interlink module (IM) 1912 according to an embodiment. All rendering commands are fetched by each VPU in the system. In any one of the multiVPU configurations described herein, after the VPUs execute the fetched commands, the IM 1912 merges the streams of pixels and control lines from the multiple VPUs and outputs a single digital video output (DVO) stream.

The IM 1912 includes a master input port that receives a DVO stream from a master VPU. The master VPU input can be from a TDMS receiver in a "dongle" configuration such as those shown in FIGS. 17 and 18. The master VPU input can alternatively come from a master VPU on a master VPU card in a multi-card configuration, as shown for example in FIGS. 13 and 14. A synchronization register 1902 receives the DVO data from the master VPU.

The IM 1912 further includes a slave input port that receives a DVO stream from a slave VPU. The slave VPU input can be from a TDMS receiver in a "dongle" configuration such as those shown in FIGS. 17 and 18 or a card configuration as in FIGS. 13 and 14. The slave VPU input can alternatively come from a slave VPU on a "super" VPU card configuration, as shown for example in FIGS. 15 and 16. The IM 1912 includes FIFOs 1904 on the slave port to help synchronize the input streams between the master VPU and the slave VPU.

The input data from both the master VPU and the slave VPU are transferred to an extended modes mixer 1914 and to a multiplexer (MUX) 1916. In one embodiment, the extended modes mixer provides the compositing functionality to perform antialiasing according to the embodiments described herein. The antialiasing functionality as described herein is also referred to as "superAA". The IM 1912 is configurable to operate in multiple compositing modes, including the superAA antialiasing mode as described herein. In one embodiment, the superAA mode is one of multiple "extended" modes. Compositing modes include alternate frame rendering (AFR) modes in which frames are rendered alternately by different VPUs. Compositing modes further include "blacking" modes in which each VPU is given a different part of a frame to process. The parts of the frame not processed are designated as containing "black" pixels. When the parts of the frame processed by both VPUs are combined, either by the extended modes mixer 1914, or by selecting only non-black pixels, the entire frame is displayed.

Control logic including a black register 1906 and a MUX path logic and black comparator 1908 determines which compositing mode the IM 1912 operates in. The output of the MUX path logic and black comparator 1908 is a select input to the MUX 1916 and extended modes mixer 1914 and dictates which of these components outputs data. Data is output to a TDMS transmitter 1918 or a DAC 1920.

In one embodiment, the inter-component communication among the VPUs and the IM 1912 includes I2C buses and protocols.

The modes are set through a combination of I2C register bits 1924 and TMDS control bits 1922 as shown in Table 1.

involve using one or more lookup tables to generate intermediate or final results.

The selection between the MUX 1916 path and the mixer 1914 path is determined by I2C register bits and control bits. For example, the mixer 1914 path is selected if:

> ENABLE_INTERLINK = 1 (I2C register)
> and  CONTROL_BITS_2 : Bit 3 and Bit 4 = 1
> (ExtendedModes and SuperAA)
> (else MUX).

Aspects of the invention described above may be implemented as functionality programmed into any of a variety of circuitry, including but not limited to programmable logic devices (PLDs), such as field programmable gate arrays (FPGAs), programmable array logic (PAL) devices, electrically programmable logic and memory devices and standard cell-based devices, as well as application specific integrated circuits (ASICs) and fully custom integrated circuits. Some other possibilities for implementing aspects of the invention include: microcontrollers with memory (such as electronically erasable programmable read only memory (EEPROM)), embedded microprocessors, firmware, software, etc. Furthermore, aspects of the invention may be embodied in microprocessors having software-based circuit emulation, discrete logic (sequential and combinatorial), custom devices, fuzzy (neural) logic, quantum devices, and hybrids of any of the above device types. Of course the underlying

TABLE 1

Operational Modes and Control Bits

| Category Main | Sub | I2C Bits | TMDS Cntr Bits | Notes |
|---|---|---|---|---|
| Passthru | Slave | INTERLINK_ENABLE = 0 CONTROL_BITS_2: Bit 3 = x | n/a | Uses 1st I2C access to determine path |
| Passthru | Master | INTERLINK_ENABLE = 0 CONTROL_BITS_2: Bit 3 = x | n/a | Uses 1st I2C access to determine path |
| Interlink | AFR_MANUAL | INTERLINK_ENABLE = 1 CONTROL_BITS_2: Bit 3 = 0 | AFR_MAN_ON* = 0 AFR_AUTO* = 1 | xAFR_MAS state changes controls the next data path |
| Interlink | AFR_AUTO | INTERLINK_ENABLE = 1 CONTROL_BITS_2: Bit 3 = 0 | AFR_MAN_ON* = 0 AFR_AUTO* = 0 | |
| Interlink | BLACKING | INTERLINK_ENABLE = 1 CONTROL_BITS_2: Bit 3 = 0 | AFR_MAN_ON* = 1 AFR_AUTO* = x | Uses black pixels to determine data path |
| Interlink | Super AA | INTERLINK_ENABLE = x CONTROL_BITS_2: Bit 3 = 1 | n/a | CONTROL_BITS_2: Bit 4-7 determines extended mode |

There are two separate data paths through the IM 1912. The two input pixel streams from the respective VPUs are either processed through the MUX 1916 (in pass-thru mode, or "standard" interlink modes), or through the mixer 1914 in extended modes, including super AA mode. As used herein, "interlink" or interlink mode" implies any multiVPU mode that is not a pass-through mode. In the MUX 1916, just one pixel from either VPU A or VPU B is selected to pass through, and no processing of pixels is involved. In the extended modes mixer 1914, processing is done on a pixel by pixel basis. However, the pixels are processed, averaged together, and reprocessed. In one embodiment, the processing steps device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other systems, not only for the system including graphics processing or video processing as described above.

For example, an antialiased image produced as described herein may be output to a variety of display devices, including computer displays that display moving pictures and printers that print static images.

The various operations described may be performed in a very wide variety of architectures and distributed differently than described. As an example, in a distributed system a server may perform some or all of the rendering process. In addition, though many configurations are described herein, none are intended to be limiting or exclusive. For example, the invention can also be embodied in a system that includes an integrated graphics processor (IGP) or video processor and a discrete graphics or video processor, where frame data processed by each of the integrated and discrete processors is merged or composited as described. Further, the invention can also be embodied in a system that includes the combination of one or more IGP devices with one or more discrete graphics or video processors.

In other embodiments not shown, the number of VPUs can be more than two.

In other embodiments, some or all of the hardware and software capability described herein may exist in a printer, camera, television, handheld device, mobile telephone, or some other device. The antialiasing techniques described herein may be applied as part of a process of constructing animation from a video sequence.

The elements and acts of the various embodiments described above can be combined to provide further embodiments. These and other changes can be made to the invention in light of the above detailed description.

In general, in the following claims, the terms used should not be construed to limit the antialiasing method and system to the specific embodiments disclosed in the specification and the claims, but should be construed to include any processing systems that operate under the claims to provide antialiasing. Accordingly, the antialiasing method and system is not limited by the disclosure, but instead the scope of the antialiasing method and system is to be determined entirely by the claims.

While certain aspects of the method and apparatus for antialiasing are presented below in certain claim forms, the inventors contemplate the various aspects of the method and apparatus for antialiasing in any number of claim forms. For example, while only one aspect of the method and apparatus for antialiasing may be recited as embodied in computer-readable medium, other aspects may likewise be embodied in computer-readable medium. Accordingly, the inventors reserve the right to add additional claims after filing the application to pursue such additional claim forms for other aspects of the method and apparatus for antialiasing.

What is claimed is:

1. A video processing apparatus, comprising:
a plurality of video processing units (VPUs), wherein each VPU processes data corresponding to one or more video frames, including sampling pixels of the one or more frames to generate a plurality of samples such that each VPU generates different samples, the different sample including products of an antialiasing operation, wherein each VPU comprises a system capable of processing the data itself as a standalone system, and wherein each VPU comprises multiple processing pipelines; and
an interlink module coupled to the plurality of VPUs, wherein the interlink module receives the plurality of samples from each VPU and combines in linear space the samples in an output video frame for display on a display device after a single pass, wherein the output video frame achieves the antialiasing operation based upon the number of said plurality of VPUS.

2. A system comprising:
at least one driver configurable to receive video data from a video application;
a plurality of video processing units (VPUs) coupled to the at least one driver, and configured to receive commands and data from the at least one driver for processing the video data from the video application in a single pass, wherein the commands include different antialiasing commands issued to each of the VPUs directing each of the VPUs to perform different antialiasing operations on a same set of video data, wherein each VPU comprises a system capable of processing the video data itself as a standalone system, and wherein each VPU comprises multiple processing pipelines that process the video data for display on a display device, wherein the video data for display achieves the summation combined in linear space of the different antialiasing commands.

3. The system of claim 2, further comprising one or more interlink modules coupled to each of the plurality of VPUs, wherein the interlink module is configurable to combine results of the different antialiasing operations performed on the same set of video data to generate frame data to be displayed.

4. The system of claim 3, wherein the results of the different antialiasing operations comprise:
a multisampling operation; and
a supersampling operation.

5. The system of claim 3, wherein the multisampling operation includes a multisampling factor.

6. The system of claim 5, wherein a multisampling factor of the frame data to be displayed is a product of the multisampling factors of the different antialiasing operations.

7. The system of claim 3, wherein the supersampling operation includes a supersampling factor.

8. The system of claim 7, wherein a supersampling factor of the frame data to be displayed is a product of the supersampling factors of the different antialiasing operations.

9. The system of claim 3, wherein the interlink module is further configurable to combine data received from the plurality of VPUs to generate combined data, and to gamma correct the combined data to generate gamma-corrected output frame data.

10. The system of claim 2, wherein the different antialiasing operations comprise each of the VPUs generating different samples from the same pixel data such that the different samples differ in at least sample location.

11. The system of claim 10, wherein the different antialiasing operations comprise one or more of multisampling, supersampling, and temporal antialiasing.

12. The system of claim 2, further comprising a user interface configurable to receive input from at least one of a user, an application, and a process, comprising input to select combinations of the different antialiasing operations to be performed among the plurality of VPUs.

13. The system of claim 2, wherein each of the plurality of VPUs is configurable to transform video data between gamma space and linear space.

14. The system of claim 2 wherein each of the plurality of VPUs comprises a texture unit configurable to transform averaged sampled video data to linear space for output by the VPU.

15. The system of claim 14, wherein the interlink module is configurable to receive the averaged sampled video data in linear space from each of the plurality of VPUs for combining.

16. A method for processing video data, the method comprising:
    generating commands for a plurality of video processing units (VPUs), wherein the commands comprise data and instructions for processing a particular video frame, and wherein at least some of the instructions are specific to one or more particular VPUs, including an antialiasing instruction, wherein each VPU comprises a system capable of processing the data itself as a standalone system and wherein each VPU comprises a plurality of processing pipelines;
    each of the plurality of VPUs processing the video data in a single pass according to the commands, including performing at least one antialiasing operation on the video data,
    converting each pipeline to linear space;
    averaging the sum of the pipelines for each of the VPU to generate output data for the particular video frame; and
    combining the output data from each of the VPUs to generate an output video frame for display on a display device, wherein an antialiasing factor of the output video frame is the sum of each antialiasing factor performed on each of the plurality of VPUs.

17. The method of claim 16, wherein the antialiasing instruction comprises at least one instruction chosen from a group comprising multisampling with a selectable antialiasing factor, supersampling with a selectable antialiasing factor, and temporal antialiasing.

18. The method of claim 16, wherein the instructions specific to one or more particular VPUs include an instruction to generate pixel data samples from particular pixel data, wherein different ones of the VPUs generate different samples from the same particular pixel data.

19. The method of claim 18, wherein the different samples differ in one or more of location and time.

20. The method of claim 16, wherein generating commands comprises:
    forming a command buffer that includes the data and instructions for processing the particular video frame as directed by an application, wherein the application comprises an end user application, wherein the command buffer is available to the plurality of VPUs.

21. The method of claim 20, wherein generating commands further comprises:
    receiving configuration input regarding antialiasing operations of the plurality of VPUs, including user configuration input from a user interface; and
    using the input to form the command buffer, wherein the configuration input comprises selection of types of antialiasing operations and antialiasing factors for each of the VPUs.

22. The method of claim 16, wherein generating the output data for the particular video frame comprises:
    performing a degamma operation to translate received data into linear space;
    averaging samples of pixel data to generate averaged sample data;
    performing a gamma operation to translate the averaged sample data into gamma space; and
    performing a degamma operation to translate the averaged sample data into linear space.

23. The method of claim 16, wherein combining further includes gamma correcting combined data to generate gamma-corrected output video frame.

24. The method of claim 16, further comprising combining the output data from each of the VPUs to generate a digital image.

25. A non-transitory computer readable medium having instruction stored thereon which, when executed in a video processing system, cause the system to perform a method comprising:
    generating commands for a plurality of video processing units (VPUs), wherein the commands comprise data and instructions for processing a particular video frame, and wherein at least some of the instructions are specific to one or more particular VPUs, including an antialiasing instruction, wherein each VPU comprises a system capable of processing the data itself as a standalone system, and wherein each VPU comprises a plurality of processing units;
    each of the plurality of VPUs processing the video data according to the commands, including performing at least one antialiasing operation on the video data, to generate output data for the particular video frame; and
    combining in linear space the output data from each of the VPUs to generate an output video frame for display on a display device in a single pass through the plurality of VPUs, wherein an antialiasing factor of the output video frame is the sum of each antialiasing factor performed on each of the plurality of VPUs.

26. The computer readable medium of claim 25, wherein the antialiasing instruction comprises at least one instruction chosen from a group comprising multisampling with a selectable antialiasing factor, supersampling with a selectable antialiasing factor, and temporal antialiasing.

27. The computer readable medium of claim 25, wherein the instructions specific to one or more particular VPUs include an instruction to generate pixel data samples from particular pixel data, wherein different ones of the VPUs generate different samples from the same particular pixel data.

28. The computer readable medium of claim 27, wherein the different samples differ in one or more of location and time.

29. The computer readable medium of claim 25, wherein generating commands comprises:
    forming a command buffer that includes the data and instructions for processing the particular video frame as directed by an application, wherein the application comprises an end user application; and
    broadcasting the command buffer to the plurality of VPUs.

30. The computer readable medium of claim 29, wherein generating commands further comprises:
    receiving configuration input regarding antialiasing operations of the plurality of VPUs, including user configuration input from a user interface; and using the input to form the command buffer, wherein the configuration input comprises selection of types of antialiasing operations and antialiasing factors for each of the VPUs.

31. A method for performing antialiasing in a system comprising multiple processing units, the method comprising:
each of the multiple processing units performing an antialiasing operation on video data in a single pass, wherein each of the multiple processing units comprises a system capable of processing the video data itself as a standalone system, and wherein each of the multiple processing units comprises a plurality of processing pipelines; and
combining results of the antialiasing operations in linear space to generate frame data for display on a display device, wherein the generated frame data for display achieves the antialiasing operation based upon the number of said multiple processing units.

32. The method of claim 31, further comprising generating a set of commands for each of the multiple processing units to execute concurrently to generate the results.

33. The method of claim 31, wherein the video data comprises pixel data for generating a frame to be displayed, and wherein each of the multiple processing units performs a different antialiasing operation on a different subset of the video data.

34. The method of claim 31, wherein the video data comprises pixel data for generating a frame to be displayed, and wherein each of the multiple processing units performs a different antialiasing operation on a same subset of the video data.

35. The method of claim 31, wherein the video data comprises pixel data for generating a frame to be displayed, and wherein each of the multiple processing units performs a different antialiasing operation on all of the video data.

36. The method of claim 31, wherein the video data comprises pixel data for at least one frame to be displayed, and wherein the pixel data is divided into portions for processing by the multiple processing units, wherein dividing comprises scissoring, and alternate frame rendering.

37. The method of claim 36, wherein each of the multiple processing units operates on a same portion.

38. The method of claim 31, wherein the multiple processing units comprise at least one integrated video processing unit (VPU) and at least one discrete VPU.

39. An apparatus for performing antialiasing, comprising:
at least one driver configurable to receive video data from an application;
multiple special-purpose processing units coupled to the at least one driver, and configurable to receive commands and data from the at least one driver for processing the video data from the application, wherein the commands include at least one antialiasing command issued to each of the multiple processing units directing each of the multiple processing units to perform said at least one antialiasing operation on the video data, wherein each of the special-purpose processing units comprises a system capable of processing the video data itself as a standalone system, and wherein each of the processing units comprises a plurality of processing pipelines; and
at least one compositor configurable to receive results of said at least one antialiasing operation and to combine them in linear space to generate frame data for display on a display device in a single pass, wherein the generated frame data for display achieves the at least one antialiasing operation based upon the number of said multiple processing units.

40. The apparatus of claim 39, wherein the apparatus is configurable via a user interface.

41. The apparatus of claim 39, wherein the at least one driver and the at least one compositor are further coupled to at least one special-purpose processing unit external to the apparatus.

42. The apparatus of claim 41, wherein the video data comprises pixel data for at least one frame to be displayed, and wherein the pixel data is divided into portions for processing by the multiple processing units, wherein dividing comprises scissoring, and alternate from rendering.

43. The apparatus of claim 42, wherein the video data comprises pixel data for generating a frame to be displayed, and wherein each of the multiple processing units performs a different antialiasing operation on a different subset of the video data.

44. The apparatus of claim 42, wherein the video data comprises pixel data for generating a frame to be displayed, and wherein each of the multiple processing units performs a different antialiasing operation on a same subset of the video data.

45. The apparatus of claim 42, wherein the video data comprises pixel data for generating a frame to be displayed, and wherein each of the multiple processing units performs a different antialiasing operation on all of the video data.

46. A processor apparatus, comprising: video processing circuitry configurable to,
receive commands and data comprising pixel data and processing commands for a frame;
perform an antialiasing operation on the pixel data in a single pass, wherein the antialiasing operation is selectable from a group comprising multisampling with a selectable antialiasing factor, supersampling with a selectable antialiasing factor and temporal antialiasing and
transmit a result of the antialiasing operation to a compositor for combination with other results of operations performed by other video processing circuitry on the pixel data, wherein video processing circuitry comprises a system capable of receiving and executing the video processing commands and of processing the video data as a standalone system, and wherein video processing circuitry includes a plurality of processing pipelines that process the pixel data in linear space for display on a display device, wherein the processed pixel data for display achieves the antialiasing operation based upon the number of said plurality of processing pipelines.

47. The processor apparatus of claim 46, wherein performing the antialiasing operation on the pixel data comprises performing the antialiasing operation on pixel data for a portion of a frame.

48. The processor apparatus of claim 46, wherein performing the antialiasing operation on the pixel data comprises performing a first antialiasing operation on pixel data for a portion of a frame, while one of the other video processing circuitry performs a second antialiasing operation on pixel data for the portion of the frame.

49. The processor apparatus of claim 46, wherein performing the antialiasing operation on the pixel data comprises performing a first antialiasing operation on pixel data for a first portion of a frame, while one of the other video processing circuitry performs a second antialiasing operation on pixel data for a second portion of the frame.

50. A user interface method for controlling an antialiasing operation, the method comprising:
receiving user input to configure multiple video processing units (VPUs) to enable antialiasing, wherein each of the multiple VPUs comprises a system capable of processing video data, including performing antialiasing, in a standalone manner, wherein each of the multiple VPUs comprises a plurality of processing pipelines that process the pixel data in linear space for display on a display device;

receiving user input to configure multiple video processing units (VPUs) to disable antialiasing; and receiving user input to configure multiple video processing units (VPUs) to perform antialiasing in a single pass, comprising each of the VPUs performing an antialiasing operation-on pixel data, wherein the processed pixel data for display achieves the antialiasing operation based upon the number of said multiple VPUS.

51. The user interface method of claim 50, further comprising receiving user input to configure each of the multiple video processing units (VPUs) to perform an antialiasing operation selected from a group comprising multisampling, supersampling and temporal antialiasing.

52. The user interface method of claim 51, further comprising receiving user input to specify at least one of an antialiasing factor for multisampling, an antialiasing factor for supersampling, and a time factor for temporal antialiasing.

53. The user interface method of claim 52, wherein the antialiasing factor for multisampling, the antialiasing factor for supersampling, and the time factor for temporal antialiasing are specified for each of the multiple VPUs.

54. The user interface method of claim 50, wherein the pixel data is for a frame, further comprising receiving user input to specify a manner of dividing the pixel data for the frame into portions to be operated on by different ones of the multiple VPUs, and wherein the manner of dividing comprises alternate frame rendering and scissoring.

55. The user interface method of claim 54, further comprising receiving user input to specify for each VPU a particular antialiasing operation and a particular antialiasing factor to be used for operating on the portion of data.

56. A video processing unit (VPU) comprising:
at least one driver configurable to receive video data from a video application for forming commands and data for generating frame data for display on a display device, including antialiasing commands and data, wherein the antialiasing commands and data comprise a first subset related to generating a first subset of pixel data, and at least one subsequent subset related to generating a subsequent subset of pixel data, the first subset and subsequent subset being part of a same video frame, wherein the at least one subsequent subset is made available for processing by at least one video processing pipeline that is external to the VPU to generate at least one subsequent subset of pixel data, wherein at least one video processing pipeline that is external to the VPU comprises at least one video processing pipeline in another, similar VPU, wherein each VPU includes a plurality of processing pipelines that process the pixel data in linear space for display on a display device, said generated frame data for display achieves the antialiasing operation of at least one video processing pipeline based upon the number of said pipelines;

a video processing pipeline configured to receive the first subset of commands and data for processing to generate the first subset of pixel data;

at least one compositor configurable to receive and combine the first subset of pixel data and the at least one second subset of pixel data to generate the frame data for display after a single pass.

57. A non-transitory computer readable medium having instruction stored thereon which, when processed, are adapted to create video processing circuitry capable of performing a method comprising:

receiving video processing commands and video data comprising pixel data and processing commands for a frame;

performing an antialiasing operation on the pixel data, wherein the antialiasing operation is selectable from a group comprising multisampling with a selectable antialiasing factor, supersampling with a selectable antialiasing factor and temporal antialiasing and transmitting a single pass result of the antialiasing operation to a compositor for combination with other single pass results of operations performed by other video processing circuitry on the pixel data, wherein video processing circuitry comprises a system with multiple processing pipelines capable of receiving and executing the video processing commands and of processing the video data as a standalone system that processes the pixel data in linear space for display on a display device, wherein the processed pixel data for display achieves the antialiasing operation based upon the number of said multiple processing pipelines.

58. A non-transitory computer readable medium having instruction stored thereon which, when processed, are adapted to create video processing circuitry of performing a method comprising:

performing an antialiasing operation on the pixel data, wherein the antialiasing operation is selectable from a group comprising multisampling with a selectable antialiasing factor, supersampling with a selectable antialiasing factor and temporal antialiasing and receiving a single pass result of other antialiasing operations from other video processing circuitry for combination with other single pass results from said performed antialiasing operations, wherein video processing circuitry comprises a system with multiple processing pipelines capable of receiving and executing the video processing commands and of processing the video data as a standalone system that process the pixel data in linear space for display on a display device, wherein the processed pixel data for display achieves the antialiasing operation based upon the number of said multiple processing pipelines.

59. The computer readable medium of claim 58, wherein said instructions stored thereon, when processed, are adapted to create a processor capable of performing a method further comprising:

combining the results of said performed antialiased operations with said received result of other antialiasing operations to generate frame data.

* * * * *

UNITED STATES PATENT AND TRADEMARK OFFICE
CERTIFICATE OF CORRECTION

| | | |
|---|---|---|
| PATENT NO. | : 8,212,838 B2 | Page 1 of 1 |
| APPLICATION NO. | : 11/140156 | |
| DATED | : July 3, 2012 | |
| INVENTOR(S) | : Preetham et al. | |

It is certified that error appears in the above-identified patent and that said Letters Patent is hereby corrected as shown below:

IN THE CLAIMS

In claim 31, at column 19, lines 13-14, after the word "operations", delete "in linear space".

Signed and Sealed this
Thirteenth Day of November, 2012

David J. Kappos
*Director of the United States Patent and Trademark Office*